United States Patent
Tomatsu et al.

(10) Patent No.: US 8,995,603 B2
(45) Date of Patent: Mar. 31, 2015

(54) CONTROL ROD/FUEL SUPPORT HANDLING APPARATUS

(75) Inventors: Tsutomu Tomatsu, Yokohama (JP); Koichi Soma, Yokohama (JP); Kaoru Takagi, Kashiwazaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 826 days.

(21) Appl. No.: 13/140,907

(22) PCT Filed: Dec. 18, 2009

(86) PCT No.: PCT/JP2009/071126
§ 371 (c)(1),
(2), (4) Date: Sep. 7, 2011

(87) PCT Pub. No.: WO2010/071197
PCT Pub. Date: Jun. 24, 2010

(65) Prior Publication Data
US 2011/0317797 A1    Dec. 29, 2011

(30) Foreign Application Priority Data

Dec. 19, 2008   (JP) ................................. 2008-324081

(51) Int. Cl.
*G21C 19/00*      (2006.01)
*G21C 19/105*    (2006.01)
(Continued)

(52) U.S. Cl.
CPC .............. *G21C 19/105* (2013.01); *G21C 19/19* (2013.01); *G21C 19/207* (2013.01)
USPC ............................. 376/262; 376/260; 376/261

(58) Field of Classification Search
CPC ...... G21C 19/00–19/065; G21C 19/10–19/115
USPC .......................... 376/245, 258, 259, 260–262
See application file for complete search history.

(56) References Cited

U.S. PATENT DOCUMENTS 5,331,675 A * 7/1994 Hosoya et al. ................ 376/260
5,570,399 A    10/1996 Sakamaki
(Continued)

FOREIGN PATENT DOCUMENTS

JP    5 164884        6/1993
JP    05164884 A *  6/1993 ............. G21C 19/20
(Continued)

OTHER PUBLICATIONS

International Preliminary Report on Patentability and Written Opinion issued Jul. 5, 2011, in PCT/JP2009/071126.
(Continued)

*Primary Examiner* — Jack W Keith
*Assistant Examiner* — Marshall O'Connor
(74) *Attorney, Agent, or Firm* — Oblon, McClelland, Maier & Neustadt, L.L.P.

(57) ABSTRACT

A control rod/fuel support handling apparatus that is used in the case where a control rod and a fuel support are held, removed and lifted in a reactor and then are transported into the reactor in a periodical inspection of a BWR and in the case where the control rod and the fuel support are attached and mounted again into the reactor, the control rod/fuel support handling apparatus including: a fuel support gripper that holds the fuel support with a support gripping member; a control rod gripper that includes a vertically movable and rotatable elevating/rotating unit, holds the control rod with a control rod gripping member, disconnects and connects the control rod and a control rod drive mechanism, and allows removal and attachment of the control rod; and a control panel that controls automatically controls the control rod gripper in response to the instructions from an operation pendant.

10 Claims, 20 Drawing Sheets

(51) Int. Cl.
*G21C 19/19* (2006.01)
*G21C 19/20* (2006.01)

(56) References Cited

U.S. PATENT DOCUMENTS 6,295,329 B1 9/2001 Maehara et al.
2002/0003850 A1 1/2002 Maehara et al.

FOREIGN PATENT DOCUMENTS

| JP | 6 82594 | 3/1994 | | |
|---|---|---|---|---|
| JP | 6 118196 | 4/1994 | | |
| JP | 06118196 A | * 4/1994 | ............ | G21C 19/20 |
| JP | 7 110394 | 4/1995 | | |
| JP | 11 304987 | 11/1999 | | |
| JP | 2002 243889 | 8/2002 | | |

OTHER PUBLICATIONS

International Search Report issued Feb. 2, 2010 in PCT/JP09/71126 filed Dec. 18, 2009.

* cited by examiner

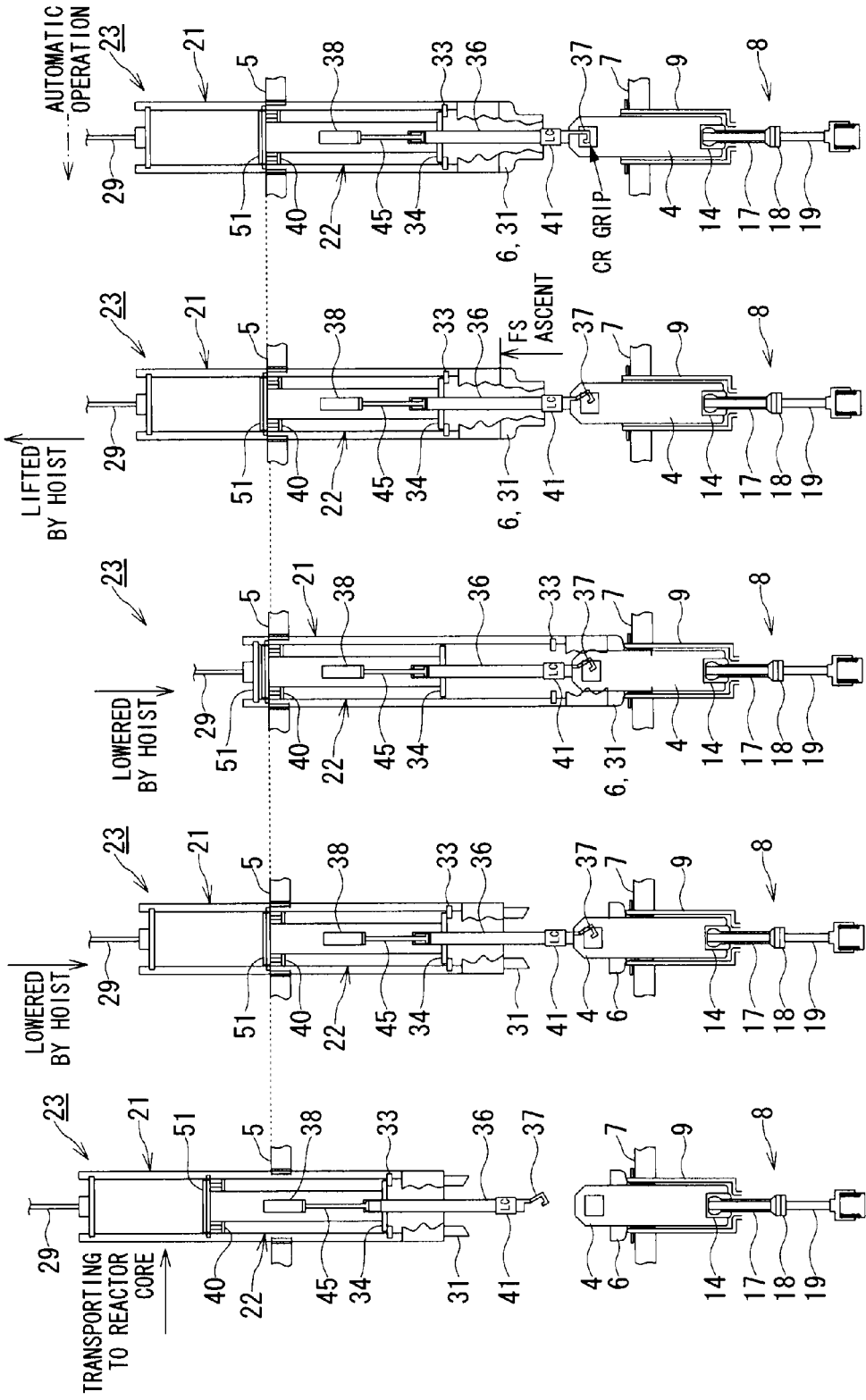

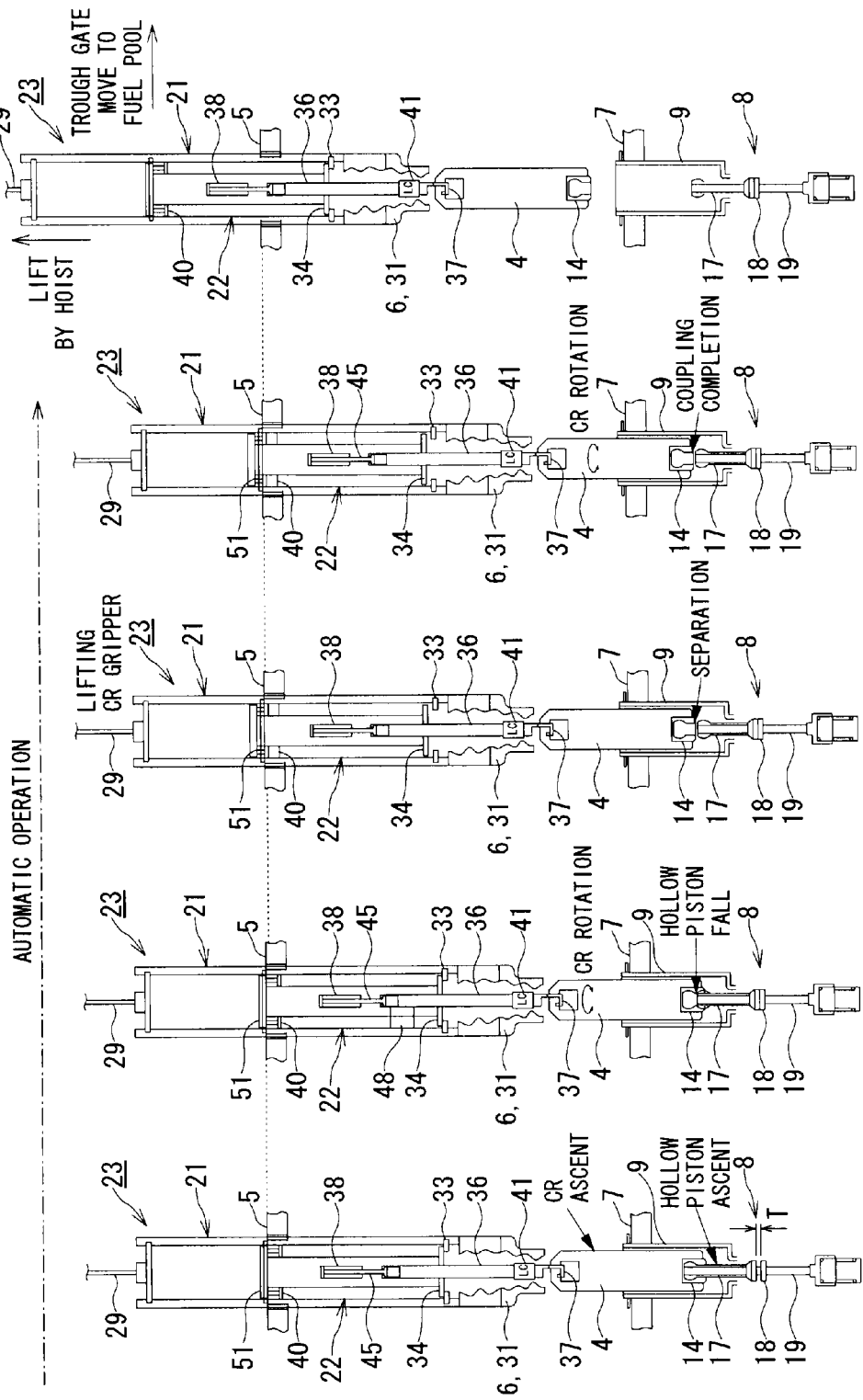

CONTROL ROD/FUEL SUPPORT HANDLING APPARATUS

TECHNICAL FIELD

The present invention relates to a control rod/fuel support handling apparatus that is used in the case where a control rod and a fuel support are held, removed and lifted in a reactor and then are transported into the reactor in a periodical inspection of a boiling water reactor (BWR) and in the case where the control rod and the fuel support are attached and mounted again in the reactor.

BACKGROUND ART

As shown in FIG. 18, a reactor core of a BWR is typically configured such that a cylindrical reactor-core shroud 2 is provided in a reactor pressure vessel 1 and fuel assemblies 3 and control rods 4 are mounted in the reactor-core shroud 2. The fuel assemblies 3 each have an upper part supported by a upper guide 5 and a lower part supported by a core plate 7 via a fuel support 6. A coolant flows into each of the fuel assemblies 3 from an orifice hole 6A of the fuel support 6.

The control rod 4 is connected to a control rod drive mechanism 8 penetrating the bottom of the reactor pressure vessel 1. The control rod drive mechanism 8 vertically moves up and down the control rod 4 in a cruciform space among the four fuel assemblies 3, which are supported by the fuel supports 6, through a control rod guide tube 9 attached to the core plate 7.

FIG. 19 shows a connecting structure of the control rod 4 and the control rod drive mechanism 8 according to the related art. Reference numeral 10 denotes a spud coupling provided on the lower end of the control rod 4. In the coupling 10, a lock plug 12 is disposed while being biased by a spring 12A. The control rod 4 and the control rod drive mechanism 8 are connected to each other by inserting a coupling spud 11 of the control rod drive mechanism 8 between the coupling 10 and the lock plug 12. When an uncoupling rod 13 of the control rod drive mechanism 8 lifts the lock plug 12 against a biasing force of the spring 12A, the control rod 4 and the control rod drive mechanism 8 are disconnected from each other.

In the case where the control rods 4 are lifted out of the reactor pressure vessel 1 in a periodic inspection of the BWR, the fuel assemblies 3 are removed out of the reactor core and then the control rods 4 and the control rod drive mechanisms 8 are disconnected from each other to lift the control rods 4 out of the reactor pressure vessel 1. As has been discussed, in the BWR of the related art, the lock plug 12 is pressed upward to disconnect the control rod 4 and the control rod drive mechanism 8. Thus unfortunately, if a foreign matter such as crud is caught between the lock plug 12 and the coupling spud 11, it is difficult to lift the lock plug 12 and the control rod 4 and the control rod drive mechanism 8 may not be disconnected from each other.

In order to solve this problem, a control rod 4 is proposed in which a bayonet coupling is used as a connector to a control rod drive mechanism 8. FIGS. 20A to 20C show a connecting structure of the control rod 4 using the bayonet coupling and the control rod drive mechanism 8. Reference numeral 14 denotes the bayonet coupling provided on the lower end of the control rod 4. The bayonet coupling 14 is configured such that engaging convex portions 16 are spaced substantially 90° apart in a circumferential direction on an inner surface of a hole 15 where coupling spuds 11 of the control rod drive mechanism 8 are inserted. In the bayonet coupling 14 of FIG. 20B, the engaging convex portions 16 of the bayonet coupling 14 and the coupling spuds 11 are engaged with each other to connect the control rod 4 and the control rod drive mechanism 8. The bayonet coupling 14 is rotated substantially 45° in the circumferential direction from a state of FIG. 20B to a state of FIG. 20C, so that the engaging convex portions 16 and the coupling spuds 11 are disengaged from each other to disconnect the control rod 4 and the control rod drive mechanism 8.

The control rod 4 with the bayonet coupling 14 is free from a foreign matter such as crud between the lock plug 12 and the coupling spuds 11 unlike in the spud coupling 10 of the related art (see FIG. 19). Thus it is possible to reliably disconnect the control rod 4 and the control rod drive mechanism 8.

For disconnection from the control rod drive mechanism 8, the bayonet coupling 14, that is, the control rod 4 has to be rotated substantially 45° about an axis. As shown in FIG. 18, the control rod 4 is inserted into the cruciform through hole (not shown) of the fuel support 6 secured by a fast pin (not shown) of the core plate 7 and thus unfortunately, the control rod 4 cannot be rotated. A forced rotation may break the control rod 4 and the fuel support 6.

In the case where the fuel support 6 is released (is made rotatable) from the fast pin of the core plate 7 and then the control rod 4 and the fuel support 6 are simultaneously rotated, a prismatic upper part of the fuel support 6 may collide with the adjacent fuel assembly 3 and lead to damage to the fuel assembly 3.

Japanese Patent Laid-Open No. 7-110394 (patent document 1) proposes a control rod/fuel support gripper that includes a fuel support gripping part and a control rod gripping part, wherein a control rod 4 and a fuel support 6 can be removed out of a reactor pressure vessel 1 and suspended at the same time.

Unfortunately, in the control rod/fuel support gripper of patent document 1, the control rod 4 and a control rod drive mechanism 8 are connected and disconnected via a bayonet coupling by human decisions and thus a human error or erroneous confirmation may occur. Thus backtracking is necessary for confirmation and correction of such errors, so that an operation time increases accordingly and affects a critical process.

DISCLOSURE OF THE INVENTION

In view of the above circumstances, an object of the present invention is to provide a control rod/fuel support handling apparatus which can reliably connect and disconnect a control rod and a control rod drive mechanism via a bayonet coupling without causing human errors or erroneous confirmation.

Another object of the present invention is to provide a control rod/fuel support handling apparatus which can considerably reduce a replacement time of a control rod by simultaneously removing or attaching the control rod and a fuel support.

The present invention provided for attaining the above object is a control rod/fuel support handling apparatus that removes and attaches a control rod disposed between fuel assemblies in a reactor pressure vessel and a fuel support installed on a core plate located below a upper guide in the reactor pressure vessel, the control rod having a lower end part detachably connected to a control rod drive mechanism via a bayonet coupling, the fuel support supporting a lower end part of the fuel assembly and allowing insertion of the control rod, the control rod/fuel support handling apparatus comprising: a fuel support gripper that is supported from above of the reactor pressure vessel so as to move in a vertical direction and holds the fuel support with a support gripping member so as to remove and attach the fuel support; a control rod gripper that is accommodated in the fuel support gripper, includes a vertically movable and rotatable elevating/rotating unit, holds the control rod with a control rod gripping member provided under the elevating/rotating unit, disconnects and connects the control rod and the control rod drive mechanism, and allows removal and attachment of the control rod; an operation mechanism that provides instructions on operations of the fuel support gripper and the control rod gripper; and a control panel that controls the fuel support gripper in response to the instructions from the operation mechanism and automatically controls the control rod gripper.

Preferred examples of the present invention will be described below.

The fuel support gripper comprises a gripper frame having a wire connecting part connecting a suspension wire on an upper end of the gripper frame, the support gripping member is provided so as to open and close on a lower end of the gripper frame, and the gripper frame may accommodate and support the control rod gripper so as to move in the vertical direction. The fuel support gripper desirably comprises: a fuel support seating detector that detects that the lower end of the gripper frame has been seated on the core plate; and a fuel support grip detector that detects that the fuel support has been held by the support gripping member.

The control rod gripper desirably comprises: a gripper body; an elevating/rotating unit provided with the control rod gripping member opened and closed on a lower end of the elevating/rotating unit; a lift cylinder that lifts and lowers the elevating/rotating unit with respect to the gripper body; a rotating mechanism that rotates the elevating/rotating unit a predetermined angle around an axis; a lifting/lowering cylinder that is provided on an upper end of the gripper body, has a piston end fixed on a locking plate lockable to the upper guide, and allows lifting and lowering of the gripper body; and a load measuring instrument that is provided in the elevating/rotating unit and measures a load applied to the control rod gripping member.

It is desirable that the gripper body of the control rod gripper or the gripper frame of the fuel support gripper comprises an upper limit position detector that detects that the gripper body is supported by the gripper frame and the gripper frame has reached an upper limit position with respect to the gripper body.

The control rod gripper comprises: an ascent/descent position detector that detects an ascent/descent position of the elevating/rotating unit lifted or lowered by the lift cylinder; a rotational position detector that detects a rotational position of the elevating/rotating unit rotated by the rotating mechanism; a lifted/lowered position detector that detects a lifted/lowered position of the gripper body lifted or lowered by the lifting/lowering cylinder; a control rod seating detector that detects that the lower end of the elevating/rotating unit has been seated on the control rod; and a control rod grip detector that detects that the control rod has been held by the control rod gripping member, wherein the control panel may automatically control the control rod gripper based on detection data of these detectors.

The ascent/descent position detector may comprise an ascent position detector that detects the ascent position of the elevating/rotating unit and a descent position detector that detects the descent position of the elevating/rotating unit.

The rotational position detector may comprise: a counterclockwise limit position detector that detects a counterclockwise rotation limit position of the elevating/rotating unit; a clockwise limit position detector that detects a clockwise rotation limit position of the elevating/rotating unit; an intermediate first position detector that detects that the elevating/rotating unit has reached an intermediate first position between the limit positions; and an intermediate second position that detects that the elevating/rotating unit has reached an intermediate second position between the limit positions.

Further, the lifted/lowered position detector may comprise: a lifted position detector that detects the lifted position of the gripper body; and a lowered position detector that detects the lowered position of the gripper body.

According to the present invention, the control rod gripper for connecting and disconnecting the control rod and the control rod drive mechanism is automatically controlled by the control panel, thereby reliably connecting and disconnecting the control rod and the control rod drive mechanism via the bayonet coupling without human errors or erroneous confirmation.

Moreover, the fuel support gripper that is supported by the suspension wire so as to remove and attach the fuel support contains the control rod gripper allowing removal and attachment of the control rod. Thus the control rod and the fuel support can be simultaneously removed or attached, considerably reducing a replacement time of the control rod.

BRIEF DESCRIPTION OF THE DRAWINGS

FIG. 7 is an explanatory drawing showing steps of removing the fuel support and a control rod.

FIG. 8 is an explanatory drawing showing steps of removing the fuel support and the control rod after the steps of FIG. 7.

BEST MODE FOR CARRYING OUT THE INVENTION

A best mode for carrying out the present invention will be described below in accordance with the accompanying drawings. The present invention is not limited to the following embodiments. Further, it should be noted that terms describing directions such as vertical and lateral directions and orientations in specifications are expressed based on illustrated states or actual operating states.

Figure 1:
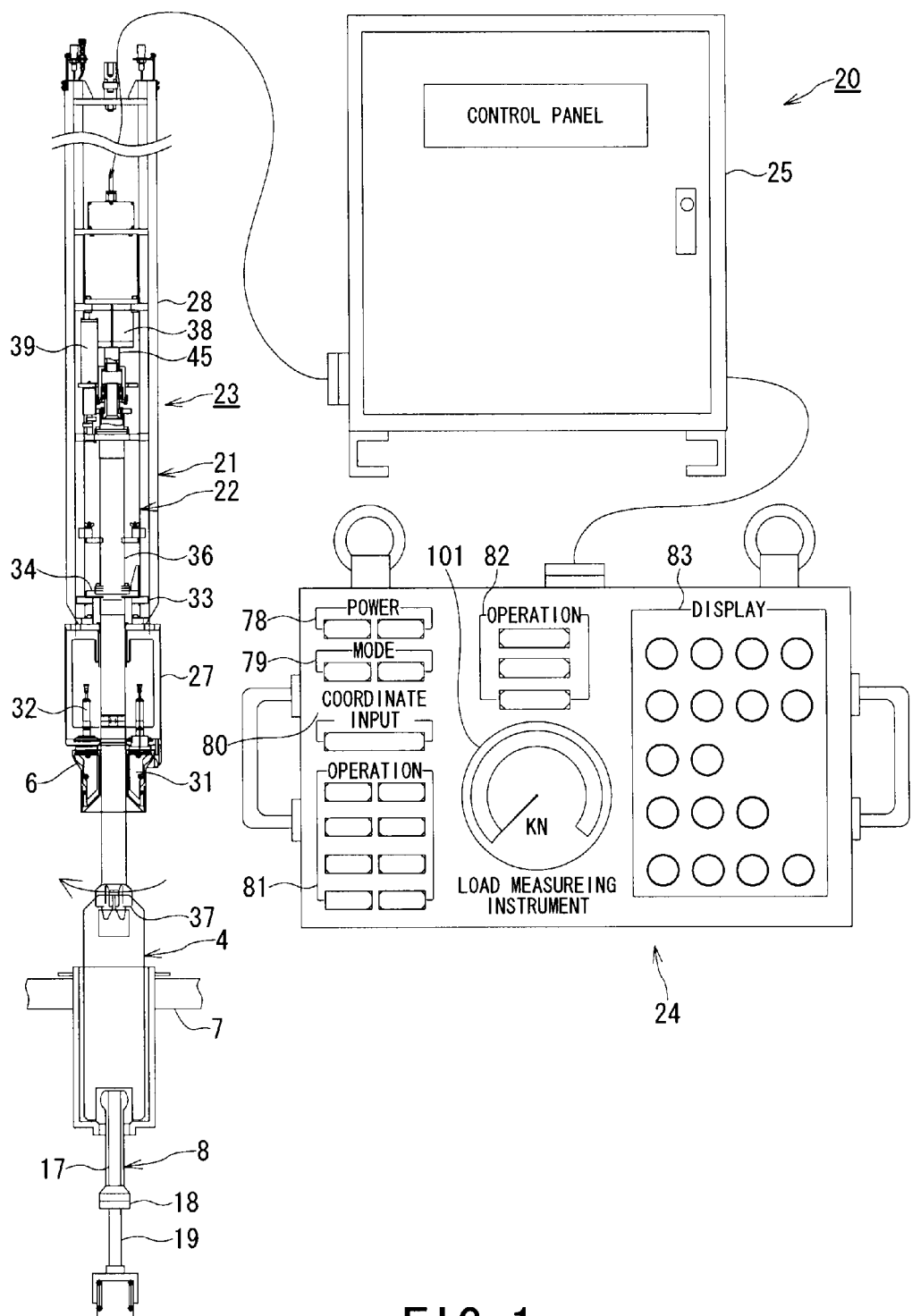
FIG. 1 is an overall structural diagram containing an embodiment of a control rod/fuel support handling apparatus according to the present invention.
Figure 2:
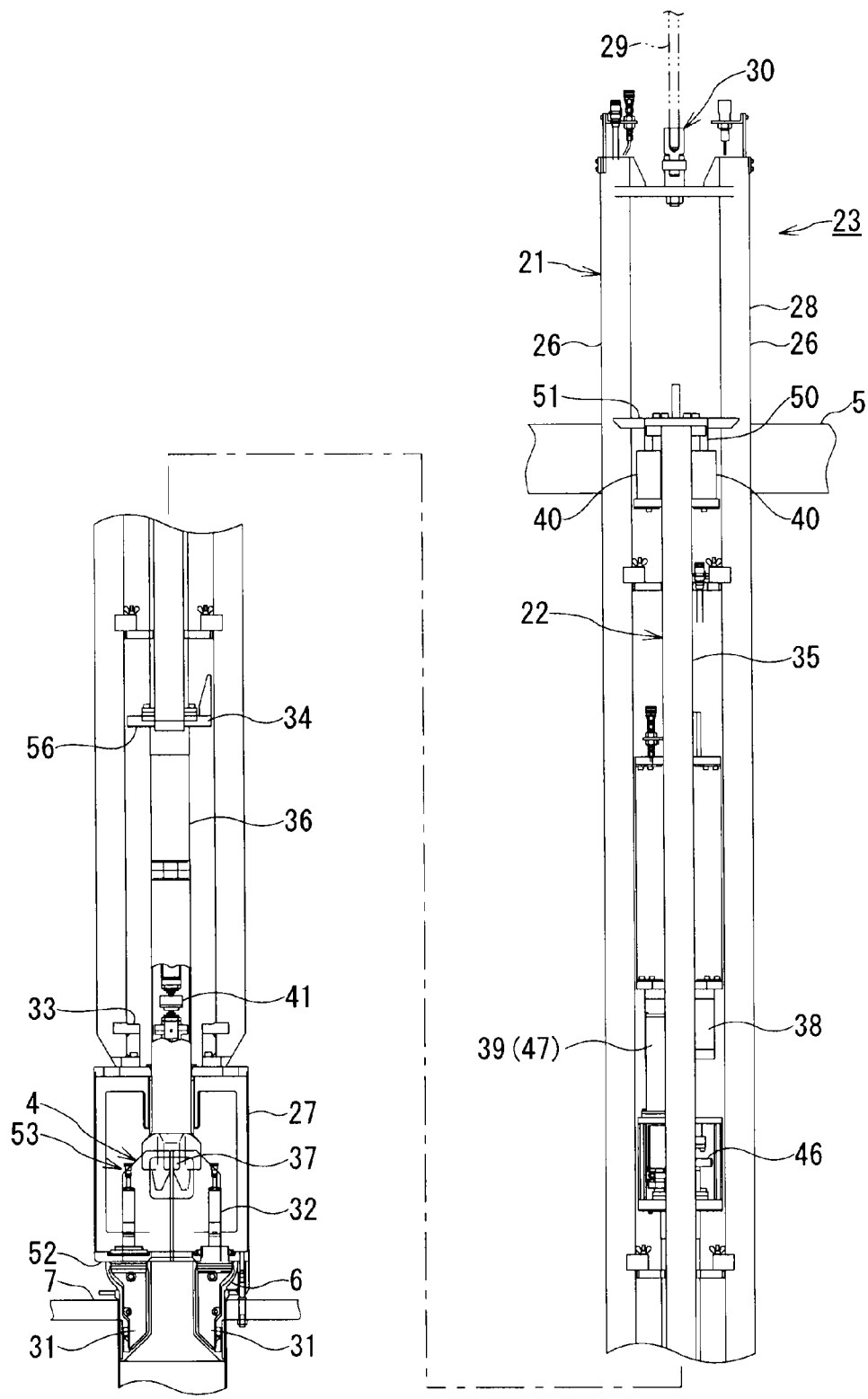
FIG. 2 is a side view showing a seating state of a gripper assembly of a fuel support gripper and a control rod gripper of FIG. 1.
Figure 4:
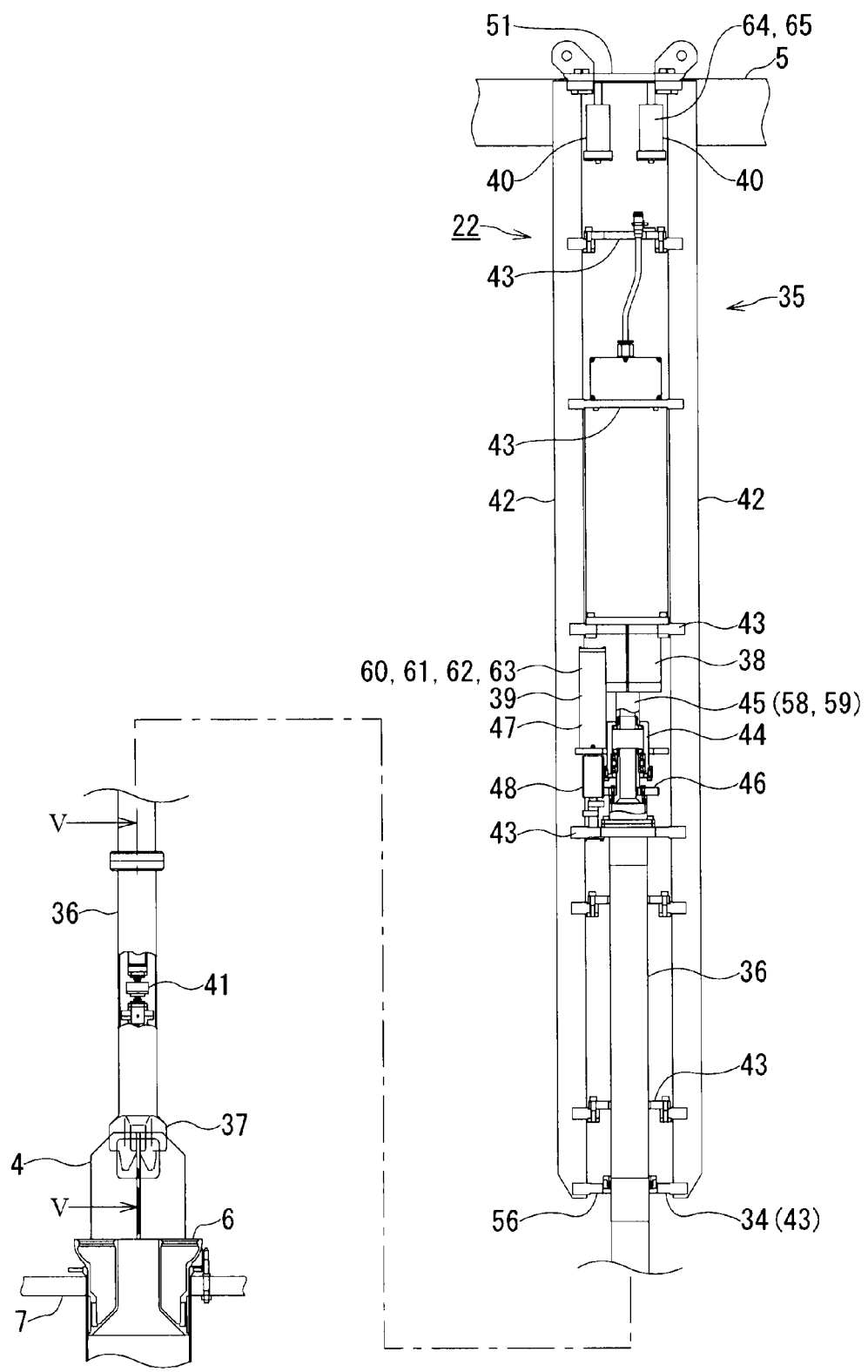
FIG. 4 is a side view showing the control rod gripper of FIG. 1.

FIG. 1 is a structural diagram showing an embodiment of a control rod/fuel support handling apparatus according to the present invention. FIG. 2 is a side view showing a sitting state in a gripper assembly of a fuel support gripper and a control rod gripper of FIG. 1. FIG. 4 is a side view showing the control rod gripper of FIG. 1. In the present embodiment, the same parts as in drawings of the related art will be indicated by the same reference numerals and the explanation thereof is simplified or omitted.

A control rod/fuel support handling apparatus 20 in FIG. 1 is used for simultaneously detaching or attaching a control rod 4 and a fuel support 6 during replacement of the control rod in a periodic inspection of a BWR. The control rod/fuel support handling apparatus 20 includes a gripper assembly 23 of a fuel support gripper 21 and a control rod gripper 22, an operation pendant 24 acting as an operation unit, and a control panel 25 electrically connected to the gripper assembly 23 and the operation pendant 24. In this configuration, the control rod 4 is coupled to the control rod drive mechanism 8 by using the bayonet coupling 14 of FIG. 20.

Figure 3:
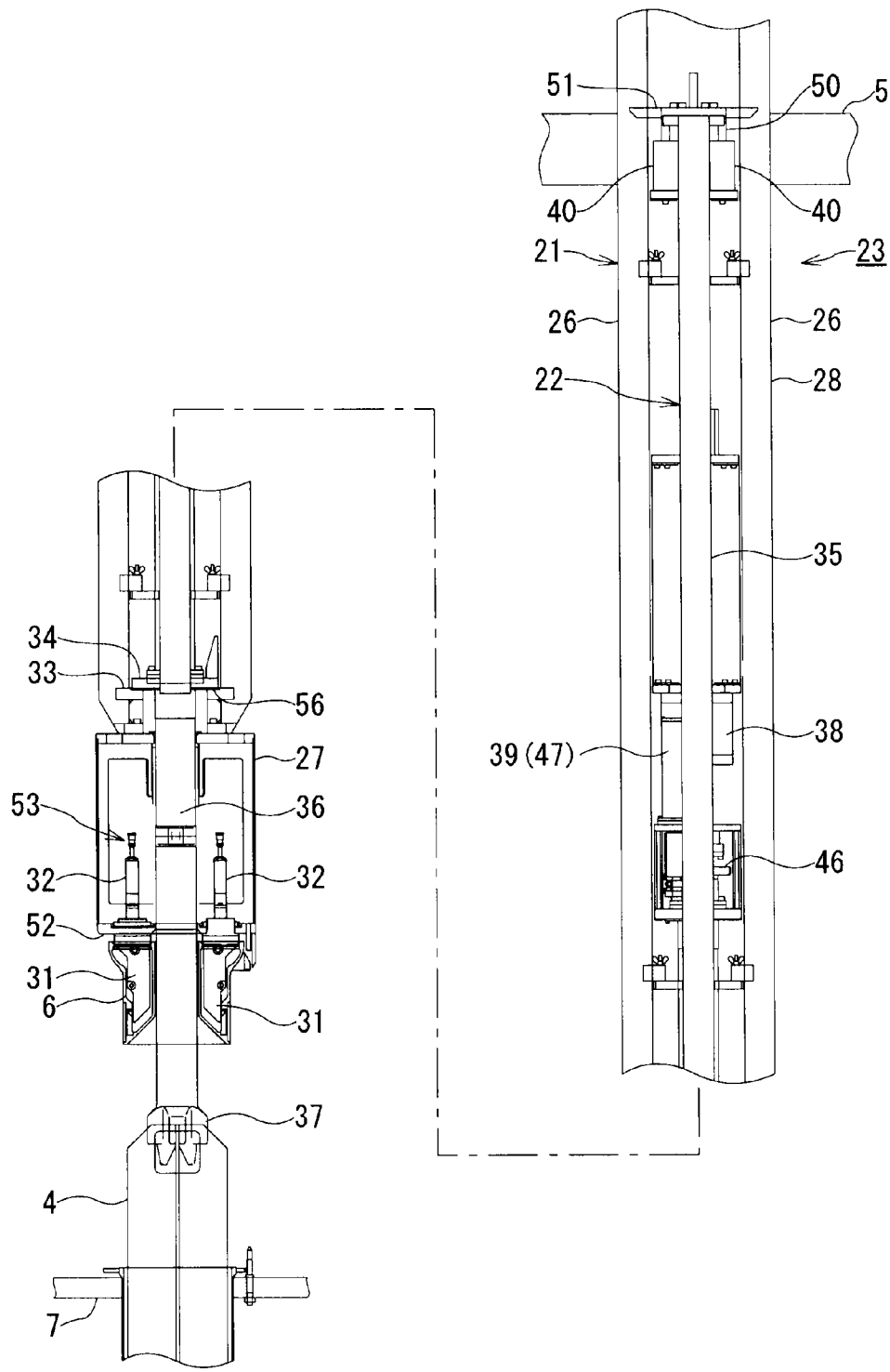
FIG. 3 is a side view showing a suspended state of the gripper assembly of FIG. 2.

As shown in FIGS. 2 and 3, the fuel support gripper 21 allows removal and attachment of the fuel support 6 and includes a gripper frame 28 having a box frame 27 fixed on the lower ends of multiple (e.g., two) pipe frames 26.

On the upper ends of the pipe frames 26, a wire connecting part 30 connecting a suspension wire 29 is provided. The fuel support gripper 21 is supported by the suspension wire 29 so as to be hoisted and lowered. Further, a support gripping member 31 is pivotally supported on the lower end of the box frame 27 by an open/close cylinder 32 so as to open and close. The support gripping member 31 holds the fuel support 6 in an opening operation.

The control rod gripper 22 is accommodated between the pipe frames 26 so as to move in a vertical direction. On the lower ends of the pipe frames 26, a locking part 33 is provided. A contact part 34 of the control rod gripper 22 comes into contact with the locking part 33 (FIG. 3), so that the control rod gripper 22 is supported by the fuel support gripper 21.

Figure 5:
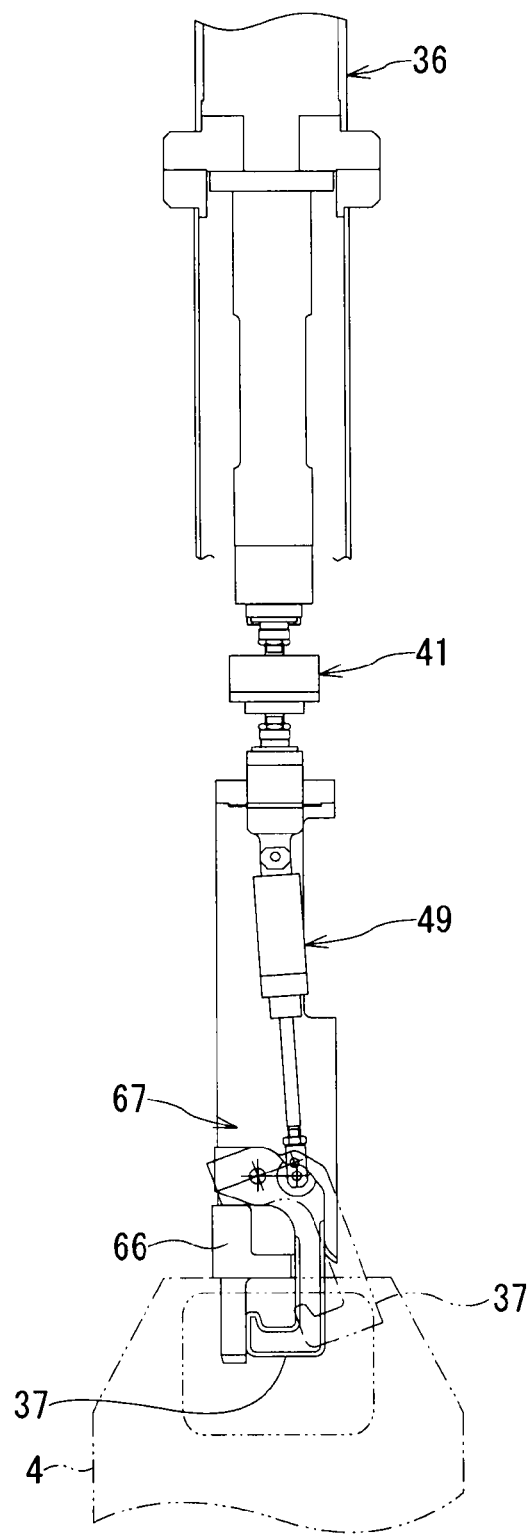
FIG. 5 is a sectional view taken along line V-V of FIG. 4.
Figure 18:
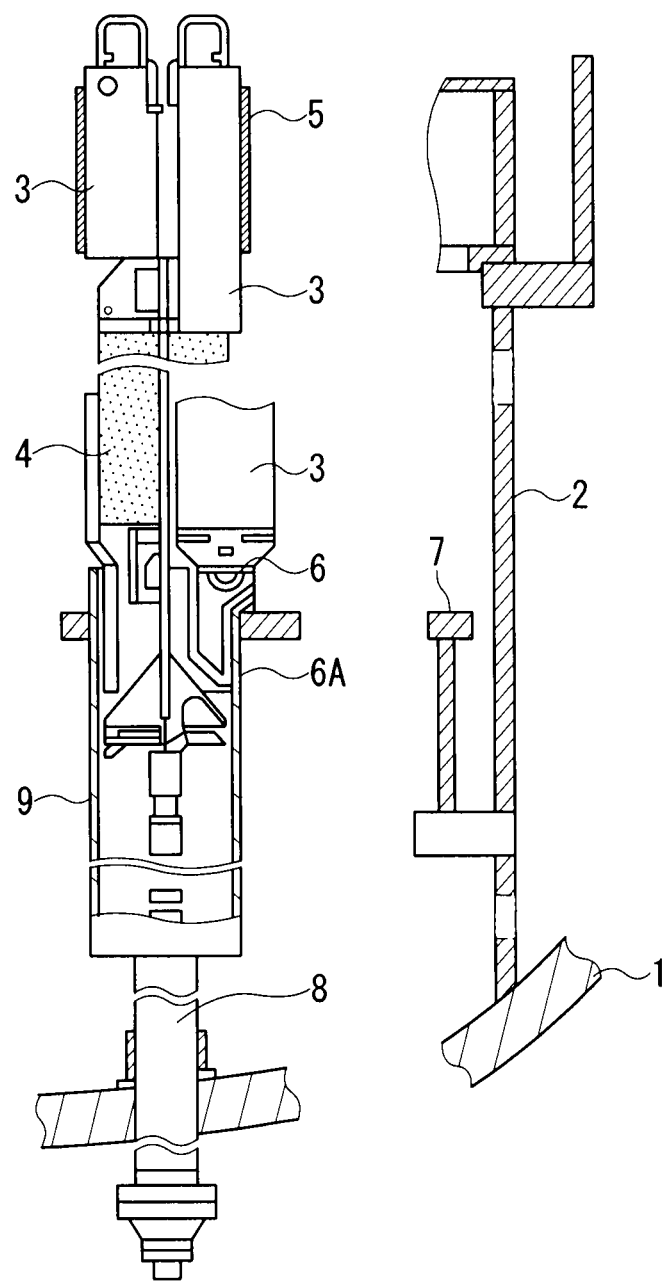
FIG. 18 is a schematic sectional view showing a reactor core of a typical BWR.
Figure 19:
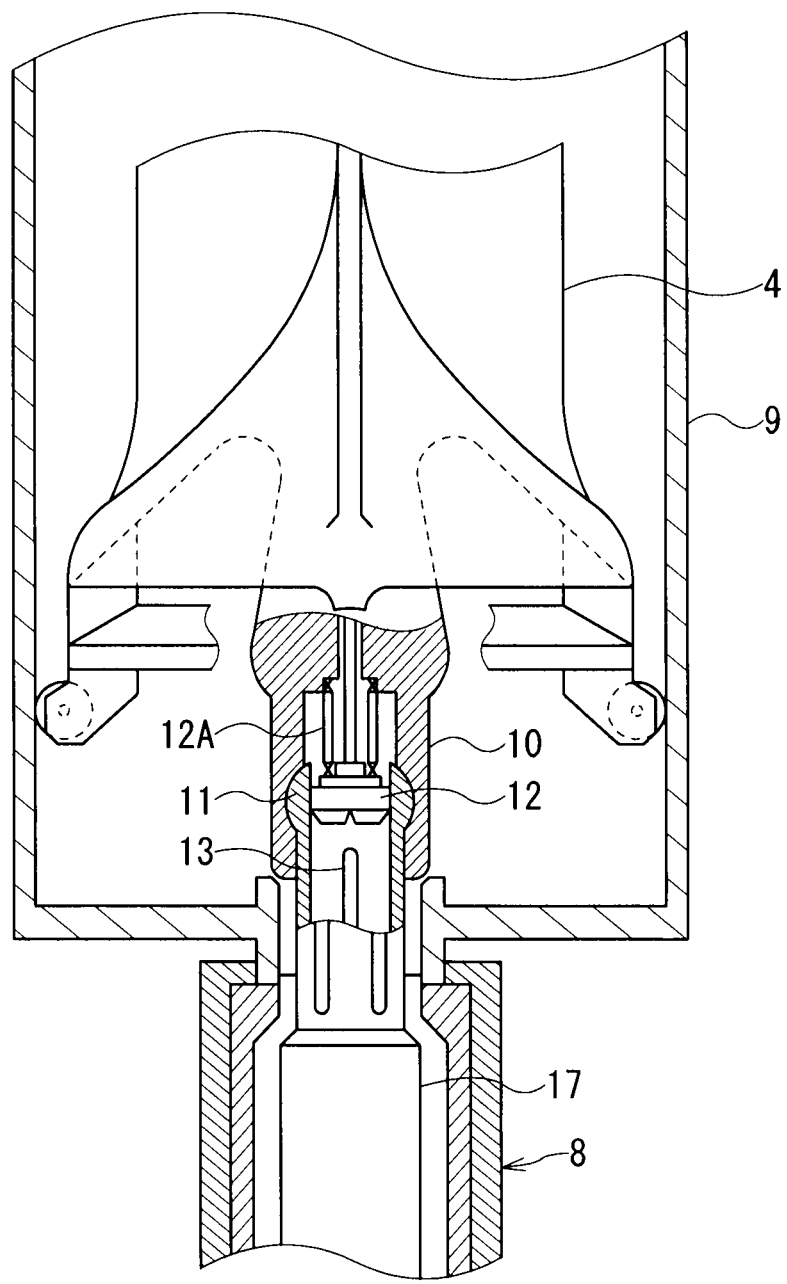
FIG. 19 is a sectional view showing a connecting structure of a control rod and a control rod drive mechanism according to the related art.

The control rod gripper 22 disconnects the control rod 4 and the control rod drive mechanism 8 of FIGS. 18 and 20 to allow removal of the control rod 4, and connects the control rod 4 and the control rod drive mechanism 8 to allow attachment of the control rod 4. As shown in FIGS. 4 and 5, the control rod gripper 22 includes a gripper body 35, a control rod gripping member 37, an elevating/rotating unit 36, a lift cylinder 38, a rotating mechanism 39, lifting/lowering cylinders 40, and a load measuring instrument 41.

The gripper body 35 includes multiple (e.g., two) pipe members 42 coupled via multiple bridge members 43. The gripper body 35 is accommodated in the pipe frames 26 of the gripper frame 28 in the fuel support gripper 21 so as to move in the vertical direction. The bridge member 43 on the lower end of the gripper body 35 acts as the contact part 34.

The elevating/rotating unit 36 has the control rod gripping member 37 on the lower end. The upper end of the elevating/rotating unit 36 is supported by the lift cylinder 38, which is installed in the gripper body 35, via a sliding mechanism 44. The sliding mechanism 44 is provided on a piston rod 45 of the lift cylinder 38 so as to slide in an axial direction of the piston rod 45. Moreover, the sliding mechanism 44 supports the upper end of the elevating/rotating unit 36 so as to rotate about an axis of the elevating/rotating unit 36. An extension of the lift cylinder 38 with the extended piston rod 45 lowers the elevating/rotating unit 36 and retraction of the lift cylinder 38 with the retracted piston rod 45 lifts the elevating/rotating unit 36.

On the upper end of the elevating/rotating unit 36, a sector gear 46 is fixed and is driven by the rotating mechanism 39. Specifically, the rotating mechanism 39 includes a motor 47 fixed in the gripper body 35, and a drive gear 48 that is attached to a drive shaft of the motor 47 and engages with the sector gear 46. Driving of the motor 47 rotates the elevating/rotating unit 36 a predetermined angle about the axis via the drive gear 48 and the sector gear 46.

As shown in FIG. 5, the control rod gripping member 37 is shaped like a hook and is pivotally supported on the lower end of the elevating/rotating unit 36 so as to be opened and closed by the open/close cylinder 49. The control rod gripping member 37 locks a handle part of the control rod 4 to hold the control rod 4 (indicated by a solid line in FIG. 5) in a closing operation and releases the handle part of the control rod 4 (indicated by a chain double-dashed line in FIG. 5) in an opening operation.

The load measuring instrument 41 is, for example, a load cell provided in the elevating/rotating unit 36 and measures a load applied to the control rod gripping member 37. Specifically, the load measuring instrument 41 decides whether only a load of the control rod 4 is applied to the control rod gripping member 37 or a total load of the control rod 4 and a hollow piston 17 of the control rod drive mechanism 8 in FIG. 7A is applied to the control rod gripping member 37 with a hollow piston 17 connected to the control rod 4 via a bayonet coupling 14. In FIGS. 7, 8, and 13 to 15, reference numeral 18 denotes a ball nut of the control rod drive mechanism 8 and reference numeral 19 denotes a ball screw of the control rod drive mechanism 8.

As shown in FIG. 4, the lifting/lowering cylinders 40 are installed on the upper end of the gripper body 35. A piston rod 50 of the lifting/lowering cylinder 40 has an end fixed on a locking plate 51 that can be locked on a upper guide 5. The lifting/lowering cylinders 40 extended with the extended piston rods 50 keep the gripper body 35 in a lowered position relative to the upper guide 5. The lifting/lowering cylinders 40 retracted with the retracted piston rods 50 keep the gripper body 35 in a lifted position relative to the upper guide 5.

As shown in FIGS. 2 and 4, the fuel support gripper 21 and the control rod gripper 22 are provided with detectors such as limit switches for detecting operating states or operating positions of members including the support gripping member 31 and the control rod gripping member 37.

Specifically, as shown in FIG. 2, the fuel support gripper 21 includes an FS seating LS 52 acting as a fuel support seating detector and an FS grip LS 53 acting as a fuel support grip detector. LS is an abbreviation of the limit switch, FS is an abbreviation of the fuel support, and CR, which will be described later, is an abbreviation of the control rod.

The FS seating LS 52 is installed on the lower end of the gripper frame 28 in the fuel support gripper 21. The FS seating LS 52 is turned on in contact with a pin (not shown) implanted on a core plate 7 and detects seating of the lower end of the gripper frame 28 on the core plate 7. The FS grip LS 53 is installed on the lower end of the gripper frame 28 or the open/close cylinder 32. The FS grip LS 53 is turned on in an opening operation of the support gripping member 31 to detect that the support gripping member 31 has held the fuel support 6. When the FS seating LS 52 is turned on, an FS seating lamp 54 of the operation pendant 24 (FIG. 6) illuminates. When the FS grip LS 53 is turned on, an FS grip lamp 55 of the operation pendant 24 illuminates.

As shown in FIGS. 2 and 3, at the contact part 34 on the gripper body 35 of the control rod gripper 22 or the locking part 33 (the contact part 34 in the present embodiment) in the gripper frame 28 of the fuel support gripper 21, an FS upper limit LS 56 that acts as an upper limit position detector is installed. The FS upper limit LS 56 is turned on when the contact part 34 comes into contact with the locking part 33. When turned on, the FS upper limit LS 56 detects that the gripper body 35 of the control rod gripper 22 has been supported by the gripper frame 28 of the fuel support gripper 21 and the gripper frame 28 of the fuel support gripper 21 has reached an upper limit position with respect to the gripper body 35 of the control rod gripper 22. When the FS upper limit LS 56 is turned on, an FS upper limit lamp 57 of the operation pendant 24 (FIG. 6) illuminates. As shown in FIGS. 4 and 5, the control rod gripper 22 includes: a CR ascent LS 58 and a CR descent LS 59 that act as ascent/descent position detectors; a CR counterclockwise limit LS 60, a CR clockwise limit LS 63, a CR intermediate first LS 61, and a CR intermediate second LS 62 that act as rotational position detectors; a CR lifting LS 64 and a CR lowering LS 65 that act as lifted/lowered position detectors; a CR seating LS 66 acting as a control rod seating detector; and a CR grip LS 67 acting as a control rod grip detector.

The ascent/descent position detectors detect ascent/descent positions of the elevating/rotating unit 36 that is lifted or lowered by the lift cylinder 38. The CR ascent LS 58 acting as an ascent position detector detects an ascent position of the elevating/rotating unit 36 (actually, a retraction position of the piston rod 45 of the lift cylinder 38) and the CR descent LS 59 acting as a descent position detector detects a descent position of the elevating/rotating unit 36 (actually, an extension position of the piston rod 45 of the lift cylinder 38). When the CR ascent LS 58 is turned on at the ascent position of the elevating/rotating unit 36 (that is, the retraction position of the piston rod 45 of the lift cylinder 38), a CR ascent lamp 68 of the operation pendant 24 (FIG. 6) illuminates. When the CR descent LS 59 is turned on at the descent position of the elevating/rotating unit 36 (that is, the extension position of the piston rod 45 of the lift cylinder 38), a CR descent lamp 69 of the operation pendant 24 illuminates.

The rotational position detectors detect the rotational position of the elevating/rotating unit 36 rotated by the rotating mechanism 39. The CR counterclockwise limit LS 60 acting as a counterclockwise limit position detector detects a counterclockwise rotation limit position of the elevating/rotating unit 36, and the CR clockwise limit LS 63 acting as a clockwise position detector detects a clockwise rotation limit position of the elevating/rotating unit 36. The CR intermediate first LS 61 acting as an intermediate first position detector detects that the elevating/rotating unit 36 has reached an intermediate first position between the counterclockwise rotation limit position and the clockwise rotation limit position (e.g., a rotational position at about 40° from the counterclockwise rotation limit position). The CR intermediate second LS 62 acting as an intermediate second position detector detects that the elevating/rotating unit 36 has reached an intermediate second position between the counterclockwise rotation limit position and the clockwise rotation limit position (e.g., a rotational position at about 50° from the counterclockwise rotation limit position).

When the elevating/rotating unit 36 reaches the counterclockwise rotation limit position, the CR counterclockwise limit LS 60 is turned on and a counterclockwise limit lamp 70 of the operation pendant 24 (FIG. 6) illuminates at the same time. When the elevating/rotating unit 36 reaches the clockwise rotation limit position, the CR clockwise limit LS 63 is turned on and a clockwise limit lamp 73 of the operation pendant 24 illuminates at the same time. Further, when the elevating/rotating unit 36 reaches the intermediate first position, the CR intermediate first LS 61 is turned on and an intermediate first lamp 71 of the operation pendant 24 illuminates at the same time. When the elevating/rotating unit 36 reaches the intermediate second position, the CR intermediate second LS 62 is turned on and an intermediate second lamp 72 of the operation pendant 24 illuminates at the same time.

The lifted/lowered position detectors detect lifted/lowered positions of the gripper body 35 that is lifted or lowered by the lifting/lowering cylinder 40. The CR lifting LS 64 acting as a lifted position detector detects a lifted position of the gripper body 35, and the CR lowering LS 65 acting as a lowered position detector detects a lowered position of the gripper body 35. When the CR lifting LS 64 is turned on at the lifted position of the gripper body 35, a CR lifting lamp 74 of the operation pendant 24 (FIG. 6) illuminates. When the CR lowering LS 65 is turned on at the lowered position of the gripper body 35, a CR lowering lamp 75 of the operation pendant 24 (FIG. 6) illuminates.

As shown in FIG. 5, the CR seating LS 66 is installed on the lower end of the elevating/rotating unit 36. When the lower end of the elevating/rotating unit 36 is seated on the handle part of the control rod 4, the CR seating LS 66 is turned on to detect the seating. The CR grip LS 67 is installed on the lower end of the elevating/rotating unit 36 or the open/close cylinder 49. When the control rod gripping member 37 is closed, the CR grip LS 67 is turned on to detect that the control rod gripping member 37 has locked and held the handle part of the control rod 4. When the CR seating LS 66 is turned on, a CR seating lamp 76 of the operation pendant 24 (FIG. 6) illuminates. When the CR grip LS 67 is turned on, a CR grip lamp 77 of the operation pendant 24 illuminates.

Figure 6:
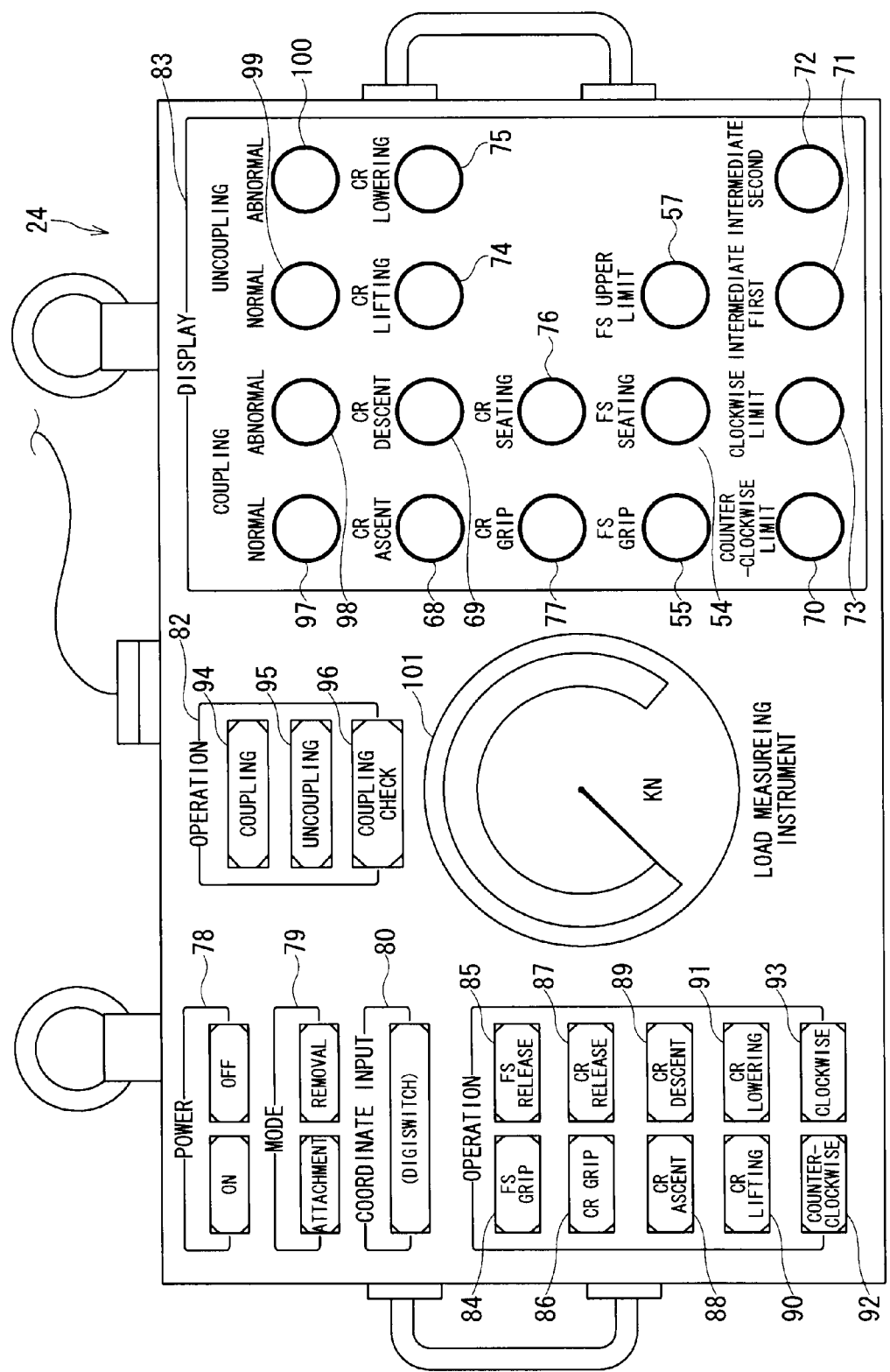
FIG. 6 is a front view showing an operation pendant of FIG. 1.

As shown in FIG. 6, the operation pendant 24 enables an operator to operate the fuel support gripper 21 and the control rod gripper 22. The operation pendant 24 includes a power switch part, a mode selecting part 79, a coordinate input part 80, a manual operation part 81, an automatic operation part 82, a display part 83, and a measured load display part 101.

The mode selecting part 79 includes switches that allow the operator to select one of attachment mode and removal mode of the control rod 4 and the fuel support 6. In the coordinate input part 80, the operator inputs a position (target position) of the control rod 4 to be operated. The target position is detected by a refueling machine including a suspending device, e.g., a hoist having the suspension wire 29, and is compared to a current position of the hoist.

The manual operation part 81 is used to allow the operator to manually operate the fuel support gripper 21 and the control rod gripper 22. The manual operation part 81 includes an FS grip switch 84, an FS release switch 85, a CR grip switch 86, a CR release switch 87, a CR ascent switch 88, a CR descent switch 89, a CR lifting switch 90, a CR lowering switch 91, a counterclockwise rotation switch 92, and a clockwise rotation switch 93.

The FS grip switch 84 is an operation switch for manually opening the support gripping member 31 of the fuel support gripper 21 to hold the fuel support 6. The FS release switch 85 is a switch for manually closing the support gripping member 31 to release the fuel support 6. The CR grip switch 86 is an operation switch for manually closing the control rod gripping member 37 of the control rod gripper 22 to hold the control rod 4. The CR release switch 87 is a switch for manually opening the control rod gripping member 37 to release the control rod 4.

The CR ascent switch 88 is an operation switch for manually retracting the lift cylinder 38 of the control rod gripper 22 to lift the elevating/rotating unit 36. The CR descent switch 89 is an operation switch for manually extending the lift cylinder 38 to lower the elevating/rotating unit 36. The CR lifting switch 90 is an operation switch for manually retracting the lifting/lowering cylinder 40 of the control rod gripper 22 to lift the gripper body 35. The CR lowering switch 91 is an operation switch for manually extending the lifting/lowering cylinder 40 to lower the gripper body 35. The counterclockwise rotation switch 92 is an operation switch for manually operating the rotating mechanism 39 of the control rod gripper 22 to rotate the elevating/rotating unit 36 counterclockwise. The clockwise rotation switch 93 is an operation switch for manually operating the rotating mechanism 39 to rotate the elevating/rotating unit 36 clockwise.

The automatic operation part 82 is used to allow the operator to automatically operate the control rod gripper 22. The automatic operation part 82 includes a coupling switch 94, an uncoupling switch 95, and a coupling check switch 96. The coupling switch 94 is an operation switch for automatically connecting the control rod 4 and the control rod drive mechanism 8 by the control rod gripper 22. The coupling check switch 96 is an operation switch for automatically checking connection between the control rod 4 and the control rod drive mechanism 8 by the control rod gripper 22. The uncoupling switch 95 is an operation switch for disconnecting the control rod 4 and the control rod drive mechanism 8 by the control rod gripper 22.

The display part 83 displays, e.g., completion of operations of the fuel support gripper 21 and the control rod gripper 22. The display part 83 includes a normal coupling lamp 97, an abnormal coupling lamp 98, a normal uncoupling lamp 99, and an abnormal uncoupling lamp 100 as well as the CR ascent lamp 68, the CR descent lamp 69, the CR lifting lamp 74, the CR lowering lamp 75, the CR grip lamp 77, the CR seating lamp 76, the FS grip lamp 55, the FS seating lamp 54, the FS upper limit lamp 57, the counterclockwise limit lamp 70, the clockwise limit lamp 73, the intermediate first lamp 71, and the intermediate second lamp 72.

The normal coupling lamp 97 illuminates when the control rod 4 and the control rod drive mechanism 8 are normally connected to each other by an automatic operation of the control rod gripper 22. The abnormal coupling lamp 98 illuminates when the connection is not normally completed. The normal uncoupling lamp 99 illuminates when the control rod 4 and the control rod drive mechanism 8 are normally disconnected from each other by an automatic operation of the control rod gripper 22. The abnormal uncoupling lamp 100 illuminates when the disconnection is not normally completed. The measured load display part 101 displays a load measured by the load measuring instrument 41 of the control rod gripper 22.

The control panel 25 of FIG. 1 controls the fuel support gripper 21 and the control rod gripper 22 in response to operation instructions from the operation pendant 24, the instructions being outputted by operations of the operation switches of the operation pendant 24. Further, the control panel 25 automatically controls the control rod gripper 22. Moreover, the control panel 25 automatically controls the control rod gripper 22 based on detection data from the CR ascent LS 58, the CR descent LS 59, the CR counterclockwise limit LS 60, the CR intermediate first LS 61, the CR intermediate second LS 62, the CR clockwise limit LS 63, the CR lifting LS 64, CR lowering LS 65, the CR seating LS 66, and the CR grip LS 67.

Referring to FIGS. 7 to 17, the following will describe steps of removing/attaching the control rod 4 and the fuel support 6 by the fuel support gripper 21 and the control rod gripper 22, as well as automatic control with the control rod gripper 22.

[A] Steps of Removing the Control Rod 4 and the Fuel Support 6 (FIGS. 7 to 12)

Figure 10:
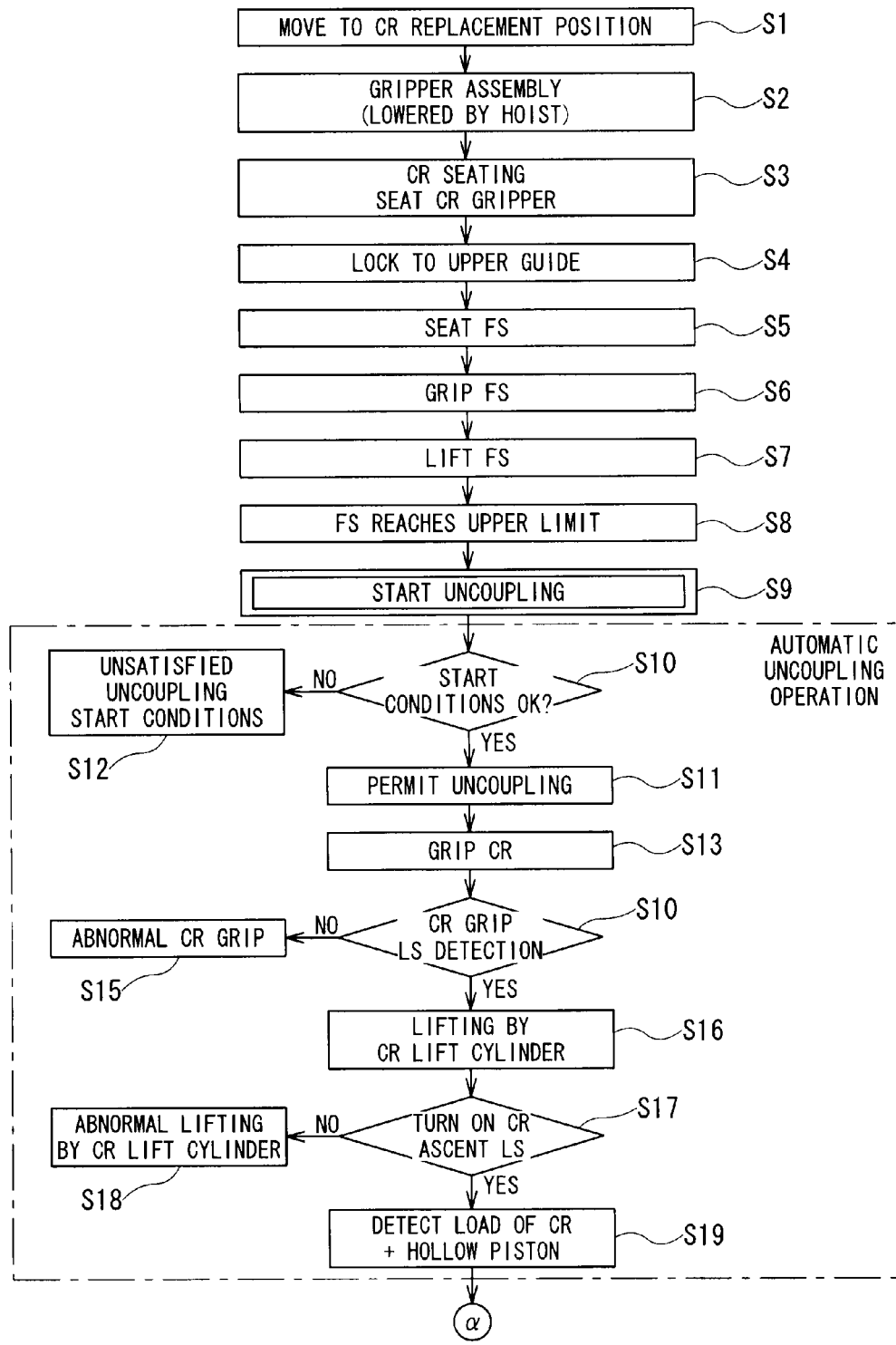
FIG. 10 is a flowchart showing the steps of removing the fuel support and the control rod.
Figure 11:
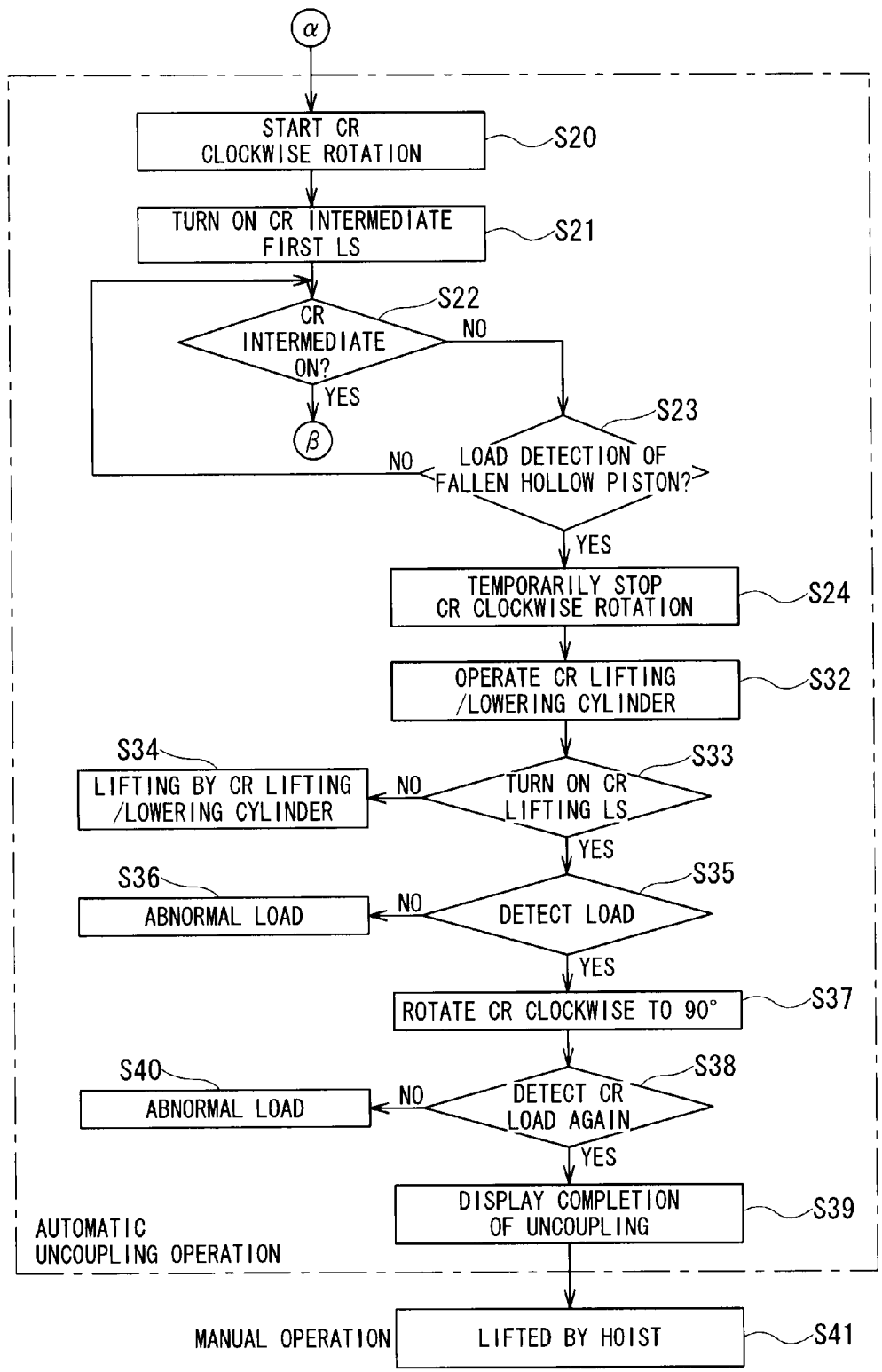
FIG. 11 is a flowchart showing the steps of removing the fuel support and the control rod after the steps of FIG. 10.
Figure 12:
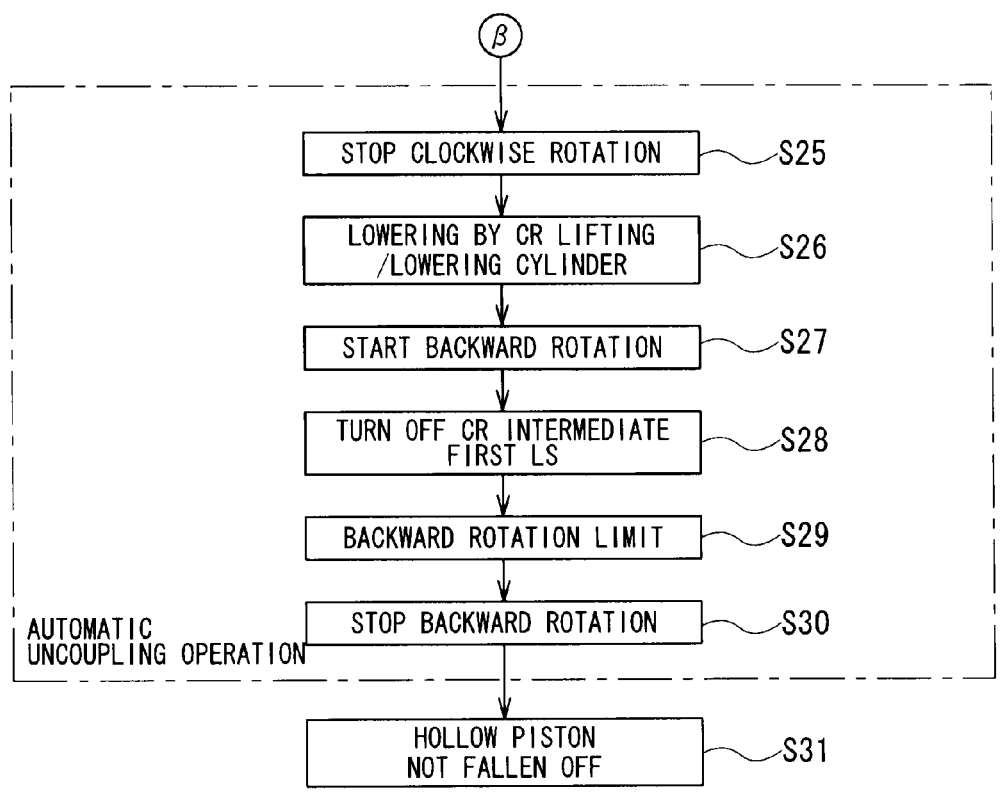
FIG. 12 is a flowchart showing a part of the steps of FIG. 11.
Figure 13:
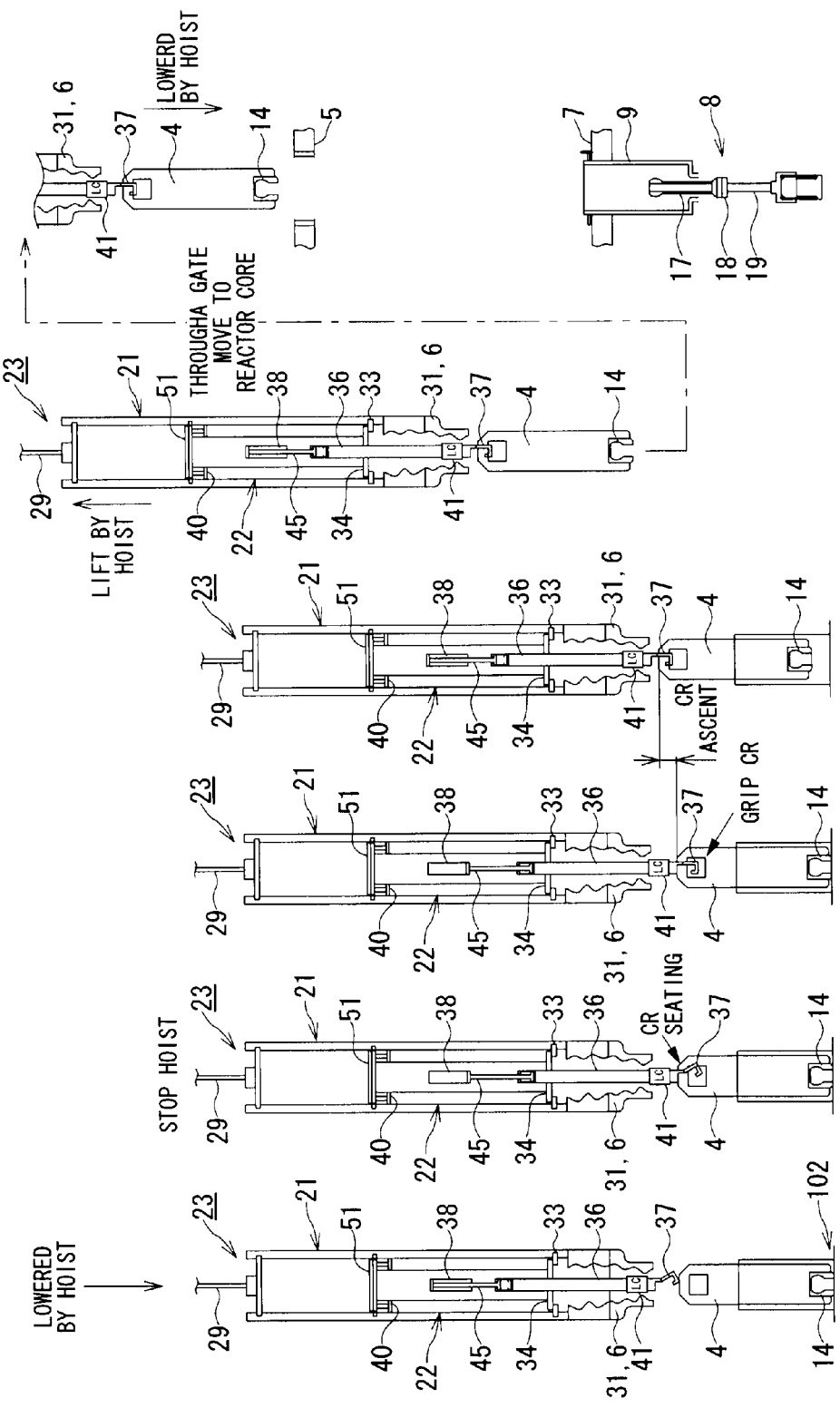
FIG. 13 (FIGS. 13A to 13F) is an explanatory drawing showing steps of, e.g., attaching the fuel support and the control rod.
Figure 14:
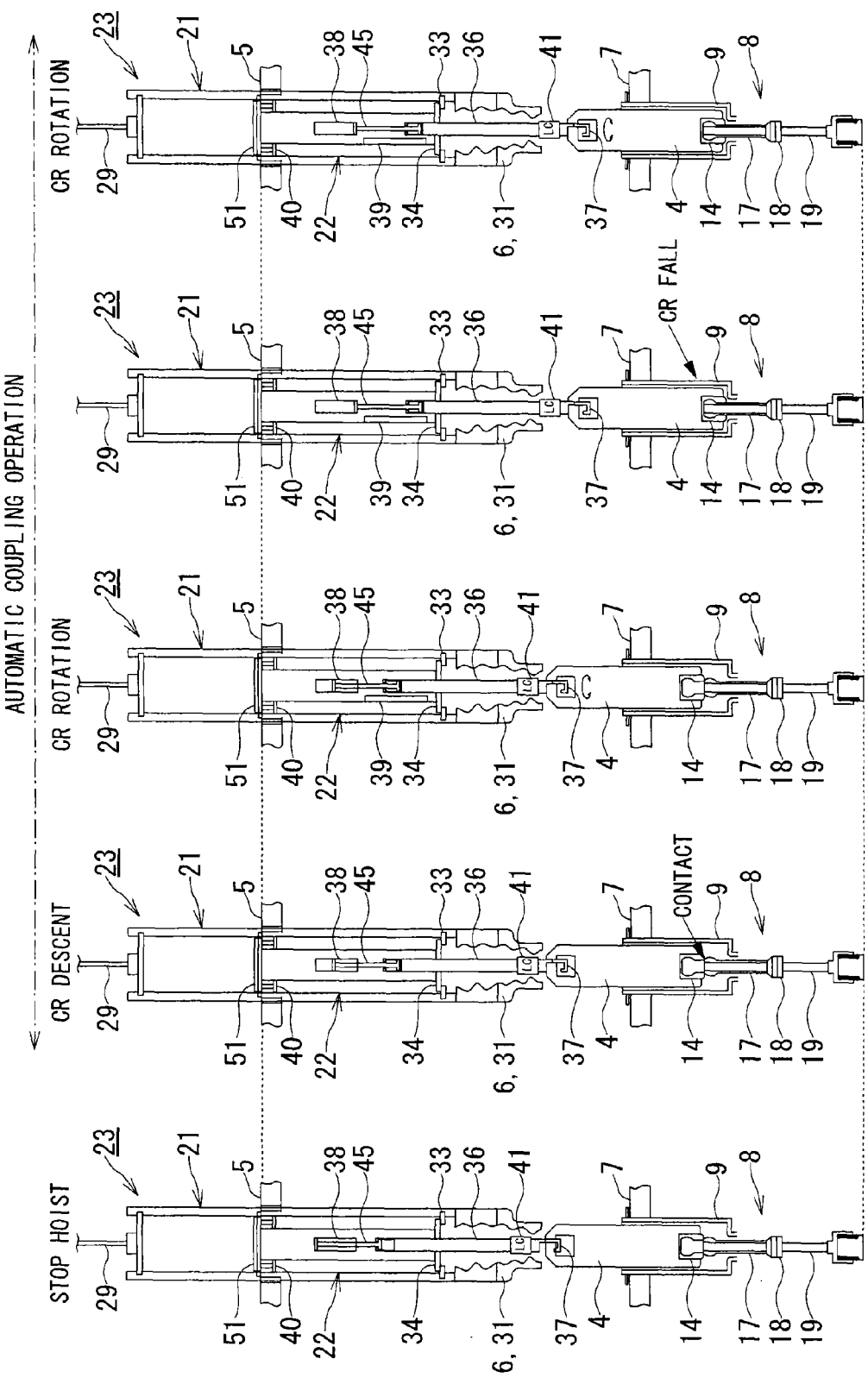
FIG. 14 (FIGS. 14G to 14K) is an explanatory drawing showing steps of, e.g., attaching the fuel support and the control rod after the steps of FIG. 13.
Figure 15:
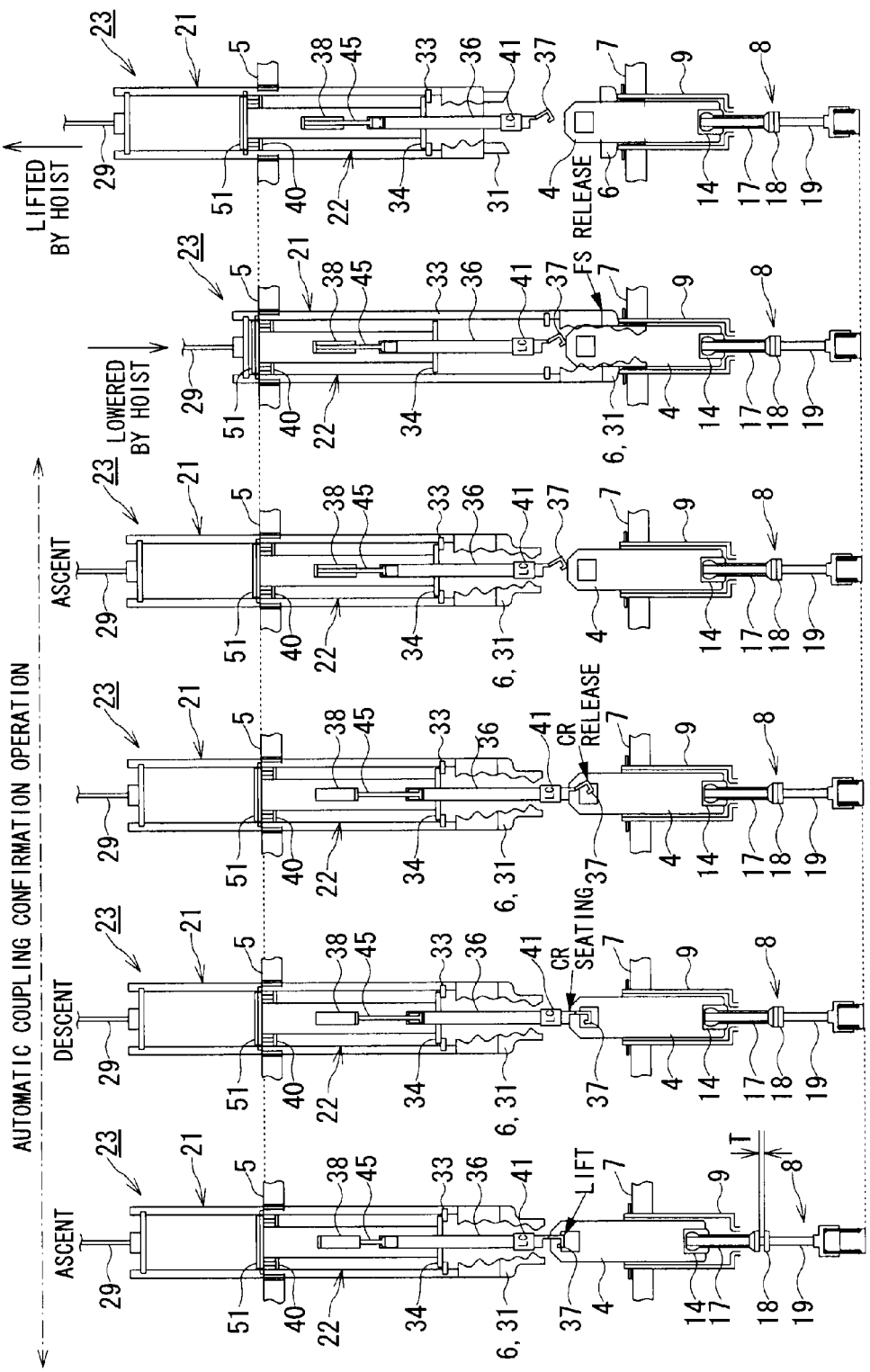
FIG. 15 (FIGS. 15L, 15M, 15O, 15P, 15Q, 15R) are explanatory drawing showing steps of, e.g., attaching the fuel support and the control rod after the steps of FIG. 14.
Figure 16:
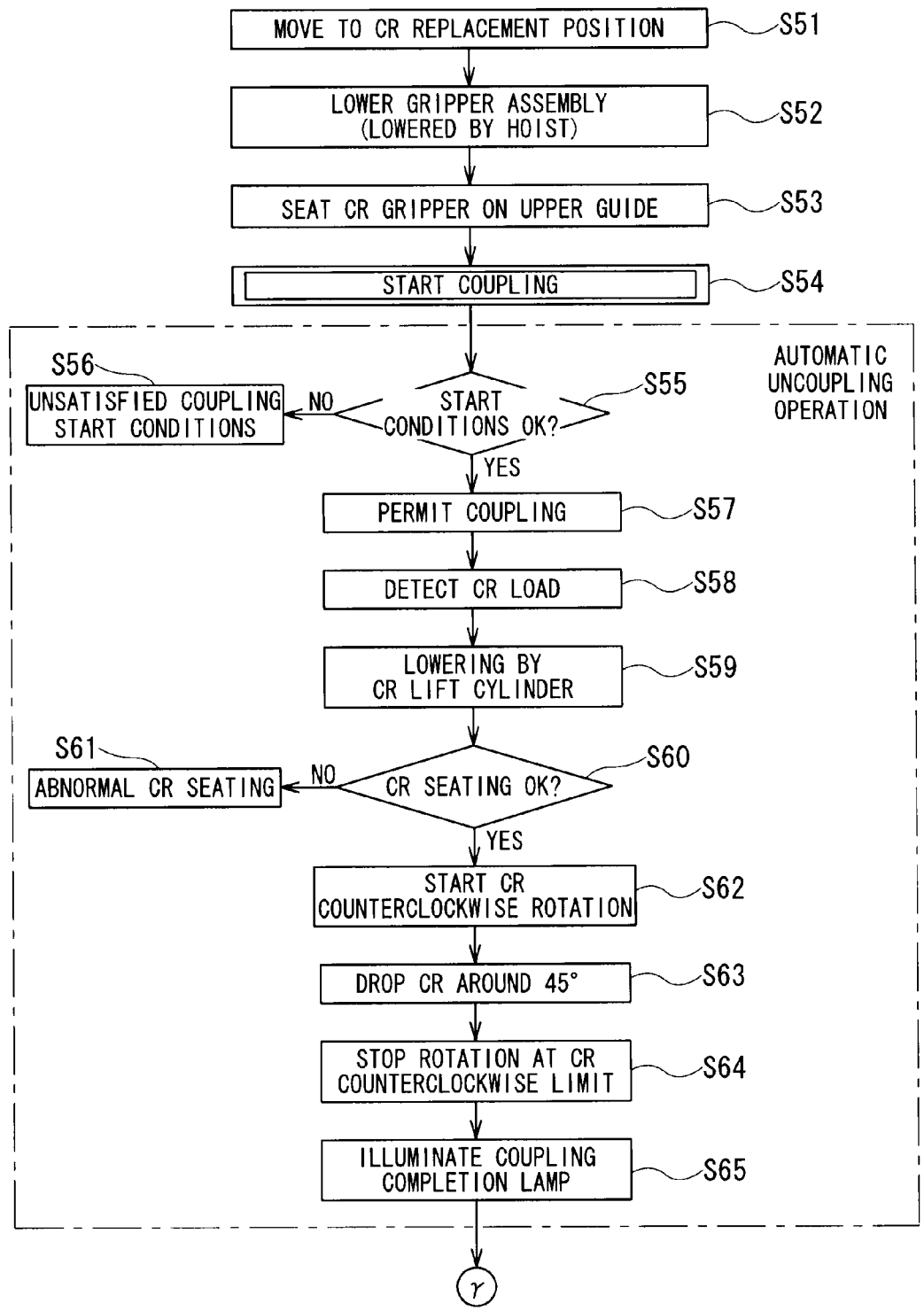
FIG. 16 is a flowchart showing the steps of, e.g., attaching the fuel support and the control rod.
Figure 17:
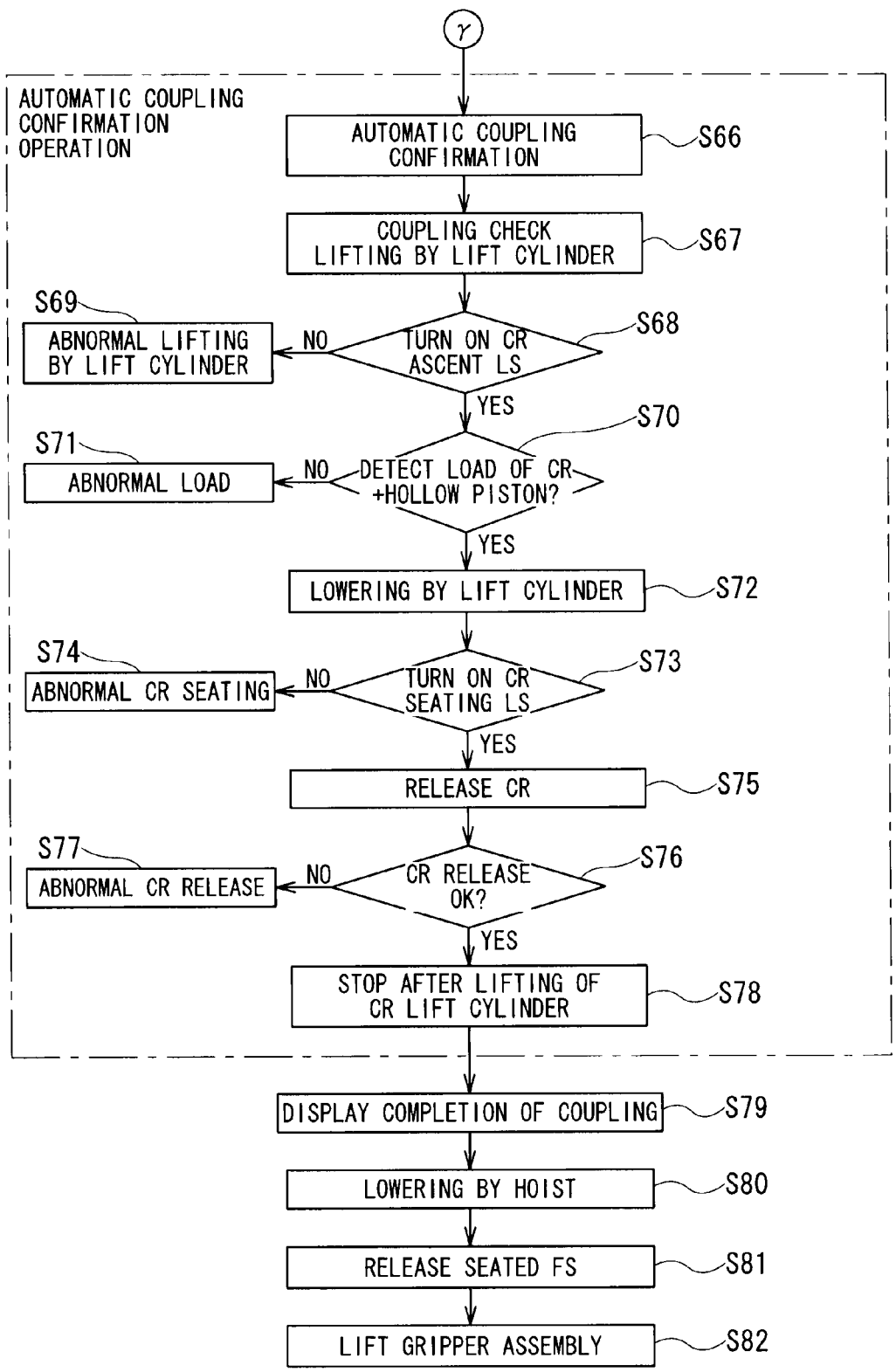
FIG. 17 is a flowchart showing the steps of, e.g., attaching the fuel support and the control rod after the steps of FIG. 16.

In the steps of removing the control rod 4 and the fuel support 6, as shown in FIG. 7A, the gripper assembly 23 of the fuel support gripper 21 and the control rod gripper 22 is first moved by the operator to the position of the control rod 4 to be removed in the reactor pressure vessel 1 (step S1 of FIG. 10). The gripper assembly 23 is moved by aligning a current position of the gripper assembly 23 with a target position. The current position is detected by the refueling machine and the target position has been inputted to the coordinate input part 80 of the operation pendant 24.

At this point, the FS upper limit LS 56 of the control rod gripper 22 is turned on to illuminate the FS upper limit lamp 57 of the operation pendant 24. Further, the lift cylinder 38 of the control rod gripper 22 is extended and the CR descent LS 59 is turned on to illuminate the CR descent lamp 69 of the operation pendant 24. Moreover, the control rod gripping member 37 of the control rod gripper 22 is opened to turn off the CR grip LS 67, and the support gripping member 31 of the fuel support gripper 21 is closed to turn off the FS grip LS 53. The control rod 4 is connected to the hollow piston 17 of the control rod drive mechanism 8 via the bayonet coupling 14.

Next, as shown in FIG. 7B, the operator operates a hoist to lower the gripper assembly 23 with the suspension wire 29. First, the lower end of the elevating/rotating unit 36 of the control rod gripper 22 is seated on the handle part of the control rod 4, and then the locking plate 51 of the control rod gripper 22 is locked to the upper guide 5 (steps S2, S3, S4). The elevating/rotating unit 36 seated on the handle part of the control rod 4 turns on the CR seating LS 66 to illuminate the CR seating lamp 76 of the operation pendant 24. Further, the control rod gripper 22 is supported by the upper guide 5 via the locking plate 51.

Next, as shown in FIG. 7C, the operator operates the hoist to lower only the fuel support gripper 21, so that the lower end of the gripper frame 28 of the fuel support gripper 21 is seated on the core plate 7 (step S5). At this point, the FS seating LS 52 is turned on to illuminate the FS seating lamp 54 of the operation pendant 24. After that, the operator opens the support gripping member 31 of the fuel support gripper 21 to hold the fuel support 6 with the support gripping member 31 (step S6). At this point, the FS grip LS 53 of the fuel support gripper 21 is turned on and the FS grip lamp 55 of the operation pendant 24 illuminates. Only the fuel support gripper 21 is hoisted, so that the FS upper limit LS 56 of the control rod gripper 22 is turned off and the FS upper limit lamp 57 of the operation pendant 24 is turned off.

Next, as shown in FIG. 7C, the operator operates the hoist to lift only the fuel support gripper 21 to an upper limit position, so that the fuel support 6 held by the support gripping member 31 is lifted to a position above the control rod 4 (steps S7 and S8). When the fuel support gripper 21 is hoisted, the lower end of the gripper frame 28 of the fuel support gripper 21 is separated from the core plate 7, so that the FS seating LS 52 is turned off and the FS seating lamp 54 of the operation pendant 24 is turned off. When the fuel support gripper 21 reaches the upper limit position, the FS upper limit LS 56 of the control rod gripper 22 is turned on to illuminate the FS upper limit lamp 57 of the operation pendant 24.

Next, the operator operates the uncoupling switch 95 of the operation pendant 24 to start an automatic uncoupling operation of disconnecting the control rod 4 and the control rod drive mechanism 8 (step S9). At this point, the control panel 25 confirms whether start conditions (specifically, whether the gripper assembly 23 has reached the target position and whether the FS upper limit LS 56, the FS grip LS 53, and the CR seating LS 66 have been turned on) are satisfied or not (step S10). In the case where the start conditions are satisfied, the control panel 25 permits uncoupling of the control rod 4 and the control rod drive mechanism 8 (step S11). In the case where the start conditions are not satisfied, the abnormal uncoupling lamp 100 of the operation pendant 24 is illuminated and the automatic control operation is temporarily stopped (step S12).

After step S11, as shown in FIG. 7E, the control panel 25 closes the control rod gripping member 37 of the control rod gripper 22 and causes the control rod gripping member 37 to hold the handle part of the control rod 4 (step S13). Thus the CR grip LS 67 is turned on to illuminate the CR grip lamp 77 of the operation pendant 24 (step S14). In the case where the CR grip LS 67 is not turned on, the CR grip lamp 77 is not illuminated, notifying the operator that the control rod gripping member 37 has not held the control rod 4 (step S15).

Next, when the CR grip LS 67 is turned on, the control panel 25 retracts the lift cylinder 38 to lift the elevating/rotating unit 36 as shown in FIG. 8F (step S16). Thus the control rod 4 rises with the elevating/rotating unit 36, and so does the hollow piston 17 of the control rod drive mechanism 8. The ascending hollow piston 17 forms a clearance T from the ball nut 18 of the control rod drive mechanism 8. Next, the control panel 25 decides whether the retraction of the lift cylinder 38 has turned on the CR ascent LS 58 or not (step S17). In the case where the CR ascent LS 58 has not been turned on, the CR ascent lamp 68 of the operation pendant 24 is not illuminated, which notifies the operator that the lift cylinder 38 has abnormally lifted the elevating/rotating unit 36 (step S18).

In the case where the CR ascent LS 58 is turned on in step S17, the control panel 25 detects a total load of the control rod 4 and the hollow piston 17 of the control rod drive mechanism 8 by means of the load measuring instrument 41 of the control rod gripper 22, and the load is stored as an operation history (step S19). When the lift cylinder 38 lifts the elevating/rotating unit 36 and the control rod 4 is locked to the control rod gripping member 37, the handle part of the control rod 4 is separated from the lower end of the elevating/rotating unit 36, so that the CR seating LS 66 is turned off and the CR seating lamp 76 of the operation pendant 24 is turned off.

Figure 20A:
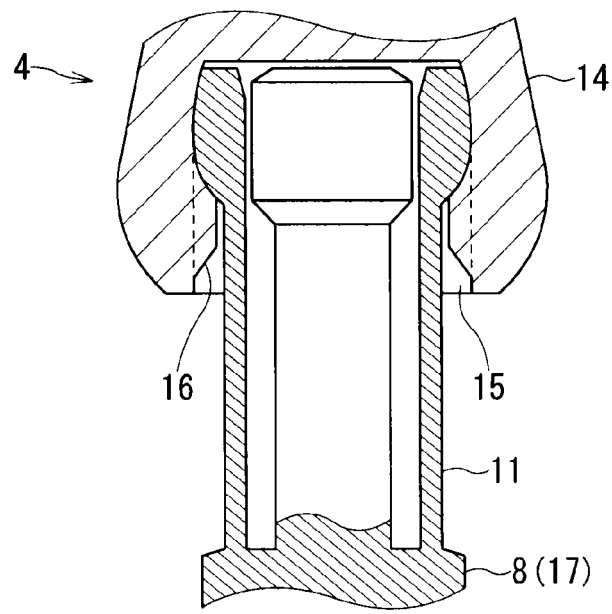
FIGS. 20A to 20C are sectional views showing that a connecting structure of a control rod and a control rod drive mechanism is a bayonet coupling.
Figure 20B:
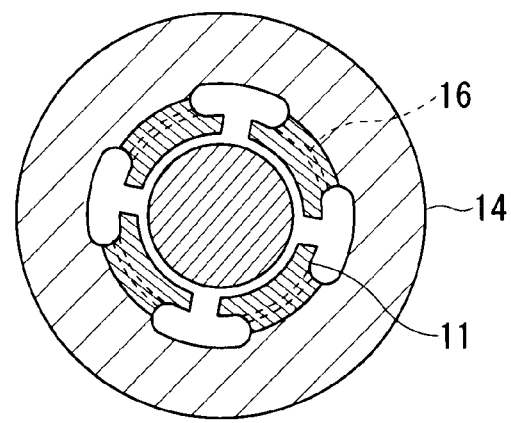
Figure 20C:
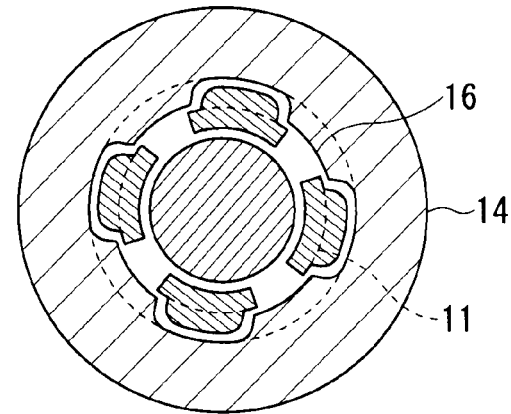

Next, as shown in FIG. 8G, the control panel 25 starts the rotating mechanism 39 to rotate the elevating/rotating unit 36 clockwise about the axis (step S20). During the rotation, when the elevating/rotating unit 36 reaches a position where the engaging convex portions 16 in the bayonet coupling 14 of the control rod 4 in FIG. 20 are disengaged from the coupling spuds 11 on the hollow piston 17 of the control rod drive mechanism 8 (FIG. 20C), the hollow piston 17 of the control rod drive mechanism 8 falls and a load value measured by the load measuring instrument 41 is reduced by a load of the hollow piston 17. The fallen hollow piston 17 is placed on the ball nut 18.

At this point, the control panel 25 decides whether elevating/rotating unit 36 has rotated enough to turn on the CR intermediate first LS 61 (illuminate the intermediate first lamp 71, step S21) and whether the load measuring instrument 41 has detected a reduction in measured value before the CR intermediate second LS 62 is turned on (steps S22 and S23). When the measured value of the load measuring instrument 41 decreases, the rotation of the elevating/rotating unit 36 by the rotating mechanism 39 is temporarily stopped by the control panel 25 (step S24).

The intermediate first position, at which the CR intermediate first LS 61 is turned on, is located at a minimum angle where the engaging convex portions 16 in the bayonet coupling 14 of the control rod 4 are expected to be disengaged from the coupling spuds 11 on the hollow piston 17 of the control rod drive mechanism 8. Further, the intermediate second position, at which the CR intermediate second LS 62 is turned on, is located at a maximum angle where the engaging convex portions 16 and the coupling spuds 11 are expected to be disengaged from each other.

In steps S22 and S23, in the case where the load measuring instrument 41 does not detect a reduction in the measured value and elevating/rotating unit 36 reaches the intermediate second position to turn on the CR intermediate second LS 62 (illuminate the intermediate second lamp 72), the control panel 25 stops the rotation of the elevating/rotating unit 36 (step S25). Next, the control panel 25 lowers the elevating/rotating unit 36 by means of the lift cylinder 38 (step S26) and then rotates the elevating/rotating unit 36 backward by means of the rotating mechanism 39 (step S27). When the CR intermediate first LS 61 is turned off (the intermediate first lamp 71 is turned off step S28) and then the elevating/rotating unit 36 reaches a counterclockwise limit position (step S29), the control panel 25 stops the backward rotation of the elevating/rotating unit 36 (step S30). An operation after step S30 is manually performed by the operator as an operation for the hollow piston 17 having not been fallen off (step S31).

After temporarily stopping the clockwise rotation of the elevating/rotating unit 36 (step S24), as shown in FIG. 8H, the control panel 25 retracts the lifting/lowering cylinder 40 of the control rod gripper 22 to lift the gripper body 35 (step S32). The lifting operation turns on the CR lifting LS 64, illuminates the CR lifting lamp 74, and completely separates the control rod 4 and the hollow piston 17 of the control rod drive mechanism 8. After step S32, the control panel 25 decides whether the CR lifting LS 64 is turned on or not (step S33). In the case where the CR lifting LS 64 is not turned on, the CR lifting lamp 74 does not illuminate, which notifies the operator that the gripper body 35 has been abnormally lifted by the lifting/lowering cylinder 40 (step S34).

In the case where the CR lifting LS 64 is turned on, the control panel 25 detects that the measured value of the load measuring instrument 41 is equal to a load value of the control rod 4 (step S35). In the case where the measured value of the load measuring instrument 41 is not equal to the load value of the control rod 4, for example, the abnormal uncoupling lamp 100 of the operation pendant 24 is illuminated to notify the operator that the load measuring instrument 41 has an abnormal measured value, that is, the hollow piston 17 of the control rod drive mechanism 8 has not been separated from the control rod 4 (step S36).

Next, as shown in FIG. 8I, the control panel 25 further rotates the elevating/rotating unit 36 clockwise to the clockwise rotation limit position by means of the control rod gripping member 37 (step S37). During or after the rotation, the lifting/lowering cylinder 40 is extended to lower the gripper body 35. When the elevating/rotating unit 36 reaches the clockwise rotation limit position, the CR clockwise limit LS 63 is turned on (the clockwise limit lamp 73 illuminates). When the gripper body 35 reaches the lowered position, the CR lowering LS 65 is turned on (the CR lowering lamp 75 illuminates).

After the elevating/rotating unit 36 has been rotated or lowered, the control panel 25 detects again whether the measured value of the load measuring instrument 41 is equal to the load value of the control rod 4 (step S38). In the case where the measured value is equal to the load value of the control rod 4, the control panel 25 illuminates the normal uncoupling lamp 99 of the operation pendant 24 to notify the operator that the control rod 4 and the control rod drive mechanism 8 have been normally uncoupled (disconnected) from each other (step S39). In the case where the measured load is not equal to the load value of the control rod 4, for example, the abnormal uncoupling lamp 100 of the operation pendant 24 is illuminated to notify the operator of an abnormal measured load (step S40). The operations of steps S10 to S39 complete the automatic uncoupling operation of disconnecting the control rod 4 and the control rod drive mechanism 8.

Figure 9K:
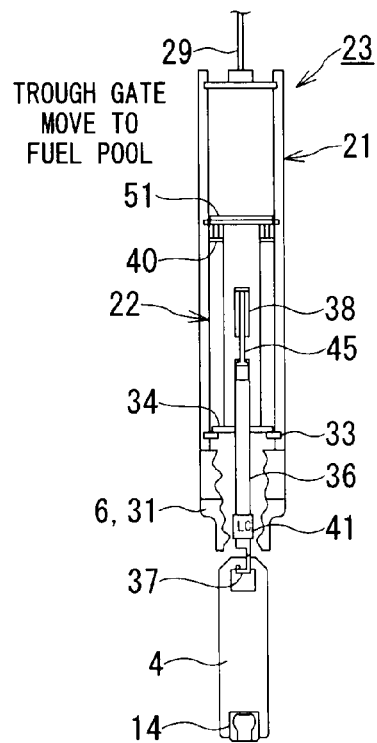
FIG. 9 is an explanatory drawing showing steps of removing the fuel support and the control rod after the steps of FIG. 8.

Next, as shown in FIG. 8J, the operator operates the hoist to lift the gripper assembly 23 (step S41) and then move the control rod held by the control rod gripper 22 of the gripper assembly 23, as shown in FIG. 9K, to a fuel pool through a gate.

Figure 9L:
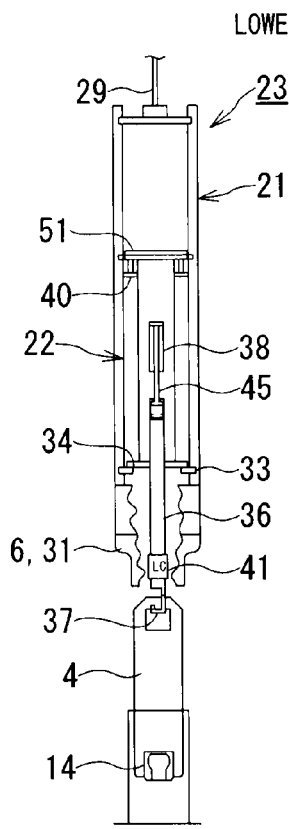

After that, as shown in FIG. 9L, the operator operates the hoist to lower the gripper assembly 23, extends the lift cylinder 38 to lower the elevating/rotating unit 36 before the control rod 4 reaches a floor of the fuel pool. The descent of the elevating/rotating unit 36 turns on the CR descent LS 59 and illuminates the CR descent lamp 69.

Figure 9M:
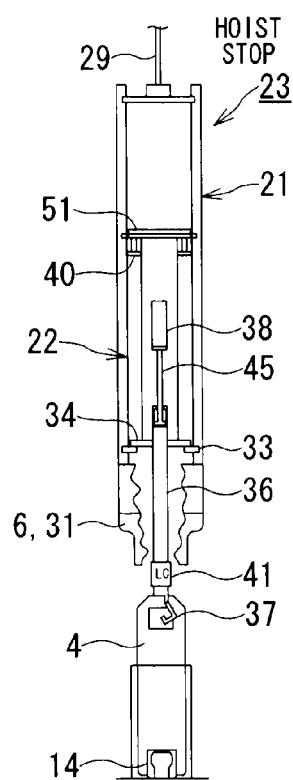

As shown in FIG. 9M, when the control rod 4 is seated on the floor of the fuel pool, the handle part of the control rod 4 is seated on the lower end of the elevating/rotating unit 36 of the control rod gripper 22 and the CR seating LS 66 is turned on (the CR seating lamp 76 illuminates). After the CR seating lamp 76 illuminates, the operator stops lowering the gripper assembly 23 and opens the control rod gripping member 37 to release the control rod 4 from the control rod gripping member 37. After confirming that the CR grip lamp 77 is turned off in response to the turned off CR grip LS 67, the operator operates the hoist to lift the gripper assembly 23, so that removal of the control rod 4 and the fuel support 6 is completed.

[B] Steps of Attaching the Control Rod 4 and the Fuel Support 6 (FIGS. 13 to 17)

In the steps of attaching the control rod 4 and the fuel support 6, first, the operator operates the hoist to lower the gripper assembly 23 as shown in FIG. 13A and collect the unused control rod 4 from a control rod rack 102.

In this state, the fuel support gripper 21 of the gripper assembly 23 has the fuel support 6 held by the support gripping member 31. Thus the FS grip LS 53 is turned on and the FS grip lamp 55 is illuminated. Further, in this state, the control rod gripping member 37 is opened on the control rod gripper 22 of the gripper assembly 23. Moreover, the contact part 34 of the control rod gripper 22 is in contact with the locking part 33 of the fuel support gripper 21 to locate the fuel support gripper 21 at the upper limit position, and the FS upper limit LS 56 is turned on to illuminate the FS upper limit lamp 57.

Next, before the lower end of the elevating/rotating unit 36 of the control rod gripper 22 is seated on the handle part of the control rod 4, as shown in FIG. 13B, the operator extends the lift cylinder 38 of the control rod gripper 22 to lower the elevating/rotating unit 36 and continuously lowers the gripper assembly 23. After that, the lower end of the elevating/rotating unit 36 of the control rod gripper 22 is seated on the handle part of the control rod 4, the CR seating LS 66 is turned on, and the CR seating lamp 76 is illuminated. At this point, the operator operates the hoist to stop lowering the gripper assembly 23.

And then, as shown in FIG., 13C, the operator closes the control rod gripping member 37 of the control rod gripper 22 to hold the handle part of the control rod 4 with the control rod gripping member 37. At this point, the CR grip LS 67 is turned on to illuminate the CR grip lamp 77.

Next, as shown in FIG. 13D, the operator retracts the lift cylinder 38 of the control rod gripper 22 to support the load of the control rod 4 with the control rod gripping member 37 and measures the load of the unused control rod 4 by means of the load measuring instrument 41. At this point, the elevating/rotating unit 36 is placed in the lifted position by the lift cylinder 38 and the CR ascent LS 58 is turned on to illuminate and the CR ascent lamp 68. Since the handle part of the control rod 4 is separated from the lower end of the elevating/rotating unit 36, the CR seating LS 66 is turned off and the CR seating lamp 76 is turned off.

Next, as shown in FIG. 13E, the operator operates the hoist to lift the gripper assembly 23 and moves the gripper assembly 23 having the suspended control rod 4 to a reactor core (into the reactor pressure vessel 1) through the gate. And then, as shown in FIG. 13F, the operator places the gripper assembly 23 with the suspended control rod 4 at the target position (step S51) and operates the hoist to lower the gripper assembly 23 (step S52).

Subsequently, as shown in FIG. 14G, when the locking plate 51 of the control rod gripper 22 locks the upper guide 5 and the control rod gripper 22 is supported by the upper guide 5, the operator operates the hoist to stop lowering the gripper assembly 23 (step S53).

In a state of FIG. 14G, the operator operates the coupling switch 94 of the operation pendant 24. Thus the control panel 25 starts an automatic coupling operation of connecting the control rod 4 and the control rod drive mechanism 8 (step S54). At this point, the control panel 25 confirms whether the start conditions (specifically, whether the gripper assembly 23 has reached the target position and whether the FS upper limit LS 56, the FS grip LS 53, and the CR grip LS 67 are turned on) are satisfied or not (step S55). In the case where the start conditions are not satisfied, the abnormal coupling lamp 98 of the operation pendant 24 illuminates and the automatic operation is temporarily stopped (step S56).

In the case where the start conditions are satisfied in step S55, the control panel 25 permits a coupling operation (step S57) and only the load of the control rod 4 measured by the load measuring instrument 41 of the control rod gripper 22 is detected and stored as a history (step S58).

Next, as shown in FIG. 14H, the control panel 25 discharges a working fluid (e.g., air) of the lift cylinder 38 to release the lift cylinder 38 and causes the elevating/rotating unit 36 and the control rod 4 to fall under their own weights (step S59). Thus the lower end of the control rod 4 comes into contact with the upper end of the hollow piston 17 of the control rod drive mechanism 8 and the handle part of the control rod 4 is seated on the lower end of the elevating/rotating unit 36, which turns on the CR seating LS 66 and illuminates the CR seating lamp 76. The control panel 25 decides whether the CR seating LS 66 is turned on (step S60). In the case where the CR seating LS 66 is not turned on, the CR seating lamp 76 is not illuminated, which notifies the operator of abnormal seating on the control rod 4 of the elevating/rotating unit 36 (step S61).

Subsequently, as shown in FIG. 14I, the control panel 25 drives the rotating mechanism 39 of the control rod gripper 22 to continuously rotate the elevating/rotating unit 36 counterclockwise in a state in which the lower end (the bayonet coupling 14) of the control rod 4 is contacted with the upper end of the hollow piston 17 of the control rod drive mechanism 8 (step S62). During the rotation, as shown in FIGS. 20A and 20C, the coupling spuds 11 of the hollow piston 17 are inserted into the bayonet coupling 14 of the control rod 4. And then, as shown in FIG. 14J, the elevating/rotating unit 36 and the control rod 4 fall under their own weights (step S63). At this point, the lower end of the elevating/rotating unit 36 is attached or detached on the handle part of the control rod 4 to turn on the CR seating LS 66 and the CR seating lamp 76 illuminates.

The control panel 25 continuously operates the rotating mechanism 39 to continuously rotate the elevating/rotating unit 36 to the counterclockwise limit position (step S64). The counterclockwise rotation of the elevating/rotating unit 36 leads to engagement, as shown in FIG. 20B, of the engaging convex portions 16 in the bayonet coupling 14 of the control rod 4 and the coupling spuds 11 of the hollow piston 17, so that the control rod 4 and the control rod drive mechanism 8 are connected to each other. When the elevating/rotating unit 36 rotates to the counterclockwise rotation limit position, the CR counterclockwise limit LS 60 is turned on to illuminate the counterclockwise limit lamp 70. At this point, the control panel 25 decides that connection of the control rod 4 and the control rod drive mechanism 8 is completed, illuminates the normal coupling lamp 97 of the operation pendant 24 (step S65), and stops the automatic coupling operation.

After the completion of the automatic coupling operation, the operator operates the coupling check switch 96 of the operation pendant 24. Thus the control panel 25 starts automatic confirmation on whether the control rod 4 and the control rod drive mechanism 8 are properly connected or not (step S66). At this point, the normal coupling lamp 97 of the operation pendant 24 is turned off.

First, as shown in FIG. 15L, the control panel 25 retracts the lift cylinder 38 of the control rod gripper 22 to lift the elevating/rotating unit 36 (step S67). The control panel 25 decides whether or not the CR ascent LS 58 has been turned on by the lifted elevating/rotating unit 36 (step S68). In the case where the CR ascent LS 58 is not turned on, the CR ascent lamp 68 is not illuminated, which notifies the operator that the lift cylinder 38 has abnormally lifted the elevating/rotating unit 36 (step S69). In the case where the CR ascent LS 58 is turned on, the CR ascent lamp 68 illuminates.

As the elevating/rotating unit 36 rises, the control rod 4 and the hollow piston 17 of the control rod drive mechanism 8 are lifted with the elevating/rotating unit 36, thereby forming the clearance T between the hollow piston 17 and the ball nut 18. The control panel 25 at this point detects whether a load measured by the load measuring instrument 41 is equal to the load of the control rod 4 or the total load of the control rod 4 and the hollow piston 17, and decides whether the control rod 4 and the control rod drive mechanism 8 are properly coupled or not (step S70). In the case where the measured value of the load measuring instrument 41 is equal to the load of the control rod 4, for example, the abnormal coupling lamp 98 is illuminated to notify the operator of abnormal coupling (step S71). When the control rod 4 and the hollow piston 17 rise with the lifted elevating/rotating unit 36, the lower end of the elevating/rotating unit 36 is separated from the handle part of the control rod 4, so that the CR seating LS 66 is turned off and the CR seating lamp 76 is turned off.

Next, as shown in FIG. 15M, the control panel 25 extends the lift cylinder 38 to lower the elevating/rotating unit 36 (step S72). The control panel 25 at this point decides whether the lower end of the elevating/rotating unit 36 is attached or detached on the handle part of the control rod 4 and the CR seating LS 66 is turned on (step S73). In the case where the CR seating LS 66 is not turned on, the CR seating lamp 76 is not illuminated, which notifies the operator that the CR seating LS 66 is not turned on (step S74). In the case where the CR seating LS 66 is turned on, the CR seating lamp 76 illuminates.

After lowering the elevating/rotating unit 36, as shown in FIG. 15O, the control panel 25 opens the control rod gripping member 37 to release the control rod 4 (step S75). At this point, the control panel 25 decides whether the CR grip LS 67 is turned off (step S76). In the case where the CR grip LS 67 is not turned off, the CR grip lamp 77 keeps illuminating, notifying the operator that the control rod gripping member 37 has abnormally released the control rod 4 (step S77). In the case where the CR grip LS 67 is turned off, the CR grip lamp 77 is turned off.

When the control panel 25 decides that the CR grip LS 67 is turned off, as shown in FIG. 15P, the control panel 25 retracts the lift cylinder 38 to lift the elevating/rotating unit 36 (step S78). At this point, the lower end of the elevating/rotating unit 36 is separated from the handle part of the control rod 4, so that the CR seating LS 66 is turned off and the CR seating lamp 76 is turned off. The control panel 25 completes the automatic coupling confirmation when the elevating/rotating unit 36 is lifted. For example, the normal coupling lamp 97 of the operation pendant 24 is illuminated to display the completion of the operation (step S79).

After the completion of the automatic coupling confirmation, as shown in FIG. 15Q, the operator operates the hoist to lower the fuel support gripper 21 (step S80). After seating the lower end of the gripper frame 28 on the core plate 7, the operator closes the support gripping member 31 to release the fuel support 6 (step S81), and then attaches the fuel support 6 to the core plate 7. At this point, the lower end of the gripper frame 28 is seated on the core plate 7, so that the FS seating LS 52 is turned on to illuminate the FS seating lamp 54. Moreover, the support gripping member 31 is closed, so that the FS grip LS 53 is turned off and the FS grip lamp 55 is turned off.

After that, as shown in FIG. 15R, the operator operates the hoist to lift the fuel support gripper 21. When the locking part 33 of the fuel support gripper 21 comes into contact with the contact part 34 of the control rod gripper 22, the fuel support gripper 21 and the control rod gripper 22 (that is, the gripper assembly 23) are hoisted (step S82), so that the attachment of the control rod 4 and the fuel support 6 is completed.

With this configuration, the present embodiment can obtain effects (1) and (2) as follows:

(1) The control rod gripper 22 for connecting and disconnecting the control rod 4 and the control rod drive mechanism 8 is automatically controlled by the control panel 25. Thus the control rod 4 and the control rod drive mechanism can be connected and disconnected via the bayonet coupling 14 without the necessity for human decision, thereby reliably enabling connection and disconnection without any human errors or erroneous confirmation.

(2) The gripper assembly 23 is configured such that the control rod gripper 22 enabling removal and attachment of the control rod 4 is accommodated in the fuel support gripper 21 that is supported by the suspension wire 29 so as to remove and attach the fuel support 6. Thus the control rod 4 and the fuel support 6 can be simultaneously removed or attached using the gripper assembly 23. Consequently, a replacement time of the control rod 4 can be considerably reduced.

The invention claimed is:

1. A control rod/fuel support handling apparatus that removes and attaches a control rod disposed between fuel assemblies in a reactor pressure vessel and a fuel support installed on a core plate located below a upper guide in the reactor pressure vessel, the control rod having a lower end part detachably connected to a control rod drive mechanism via a bayonet coupling, the fuel support supporting a lower end part of the fuel assembly and allowing insertion of the control rod in a cruciform space, the control rod/fuel support handling apparatus comprising:
a fuel support gripper that is supported from above of the reactor pressure vessel so as to move in a vertical direction and holds the fuel support with a support gripping member so as to remove and attach the fuel support;
a control rod gripper that is accommodated in the fuel support gripper, includes a vertically movable and rotatable elevating/rotating unit, holds the control rod with a control rod gripping member provided under the elevating/rotating unit, disconnects and connects the control rod and the control rod drive mechanism, and allows removal and attachment of the control rod through the cruciform space of the fuel support;
a fuel support seating detector which detects seating of the lower end of the support gripping member on the core plate;
a fuel support grip detector which detects that the support gripping member holds the fuel support;
a load measuring instrument that is provided in the elevating/rotating unit and measures a load applied to the control rod gripping member;
an operation mechanism that provides instructions on operations of the fuel support gripper and the control rod gripper, the operation mechanism configured to be operated by a first signal from said fuel support seating detector, a second signal from said fuel support grip detector, and a third signal from said load measuring instrument; and
a control panel that controls the fuel support gripper in response to the instructions from the operation mechanism and automatically controls the control rod gripper.

2. The control rod/fuel support handling apparatus according to claim 1, wherein the fuel support gripper comprises a gripper frame having a wire connecting part connecting a suspension wire on an upper end of the gripper frame, the support gripping member is provided so as to open and close on a lower end of the gripper frame, and the gripper frame accommodates and supports the control rod gripper so as to move in the vertical direction.

3. The control rod/fuel support handling apparatus according to claim 2, wherein the fuel support gripper comprises:
a fuel support seating detector that detects that the lower end of the gripper frame has been seated on the core plate; and
a fuel support grip detector that detects that the fuel support has been held by the support gripping member.

4. The control rod/fuel support handling apparatus according to claim 2, wherein a gripper body of the control rod gripper or the gripper frame of the fuel support gripper comprises an upper limit position detector that detects that the gripper body is supported by the gripper frame and the gripper frame has reached an upper limit position with respect to the gripper body.

5. The control rod/fuel support handling apparatus according to claim 1, wherein the control rod gripper comprises:
a gripper body;
an elevating/rotating unit provided with the control rod gripping member opened and closed on a lower end of the elevating/rotating unit;
a lift cylinder that lifts and lowers the elevating/rotating unit with respect to the gripper body;
a rotating mechanism that rotates the elevating/rotating unit a predetermined angle around an axis;
a lifting/lowering cylinder that is provided on an upper end of the gripper body, has a piston end fixed on a locking plate lockable to the upper guide, and allows lifting and lowering of the gripper body; and
a load measuring instrument that is provided in the elevating/rotating unit and measures a load applied to the control rod gripping member.

6. The control rod/fuel support handling apparatus according to claim 5, wherein the gripper body of the control rod gripper or the gripper frame of the fuel support gripper comprises an upper limit position detector that detects that the gripper body is supported by the gripper frame and the gripper frame has reached an upper limit position with respect to the gripper body.

7. The control rod/fuel support handling apparatus according to claim 5, wherein the control rod gripper comprises:
an ascent/descent position detector that detects an ascent/descent position of the elevating/rotating unit lifted or lowered by the lift cylinder;
a rotational position detector that detects a rotational position of the elevating/rotating unit rotated by the rotating mechanism;
a lifted/lowered position detector that detects a lifted/lowered position of the gripper body lifted or lowered by the lifting/lowering cylinder;
a control rod seating detector that detects that the lower end of the elevating/rotating unit has been seated on the control rod; and
a control rod grip detector that detects that the control rod has been held by the control rod gripping member,
wherein the control panel automatically controls the control rod gripper based on detection data of these detectors.

8. The control rod/fuel support handling apparatus according to claim 7, wherein the ascent/descent position detector comprises:
an ascent position detector that detects the ascent position of the elevating/rotating unit; and
a descent position detector that detects the descent position of the elevating/rotating unit.

9. The control rod/fuel support handling apparatus according to claim 7, wherein the rotational position detector comprises:
a counterclockwise limit position detector that detects a counterclockwise rotation limit position of the elevating/rotating unit;
a clockwise limit position detector that detects a clockwise rotation limit position of the elevating/rotating unit;

an intermediate first position detector that detects that the elevating/rotating unit has reached an intermediate first position between the limit positions; and an intermediate second position that detects that the elevating/rotating unit has reached an intermediate second position between the limit positions.

10. The control rod/fuel support handling apparatus according to claim 7, wherein the lifted/lowered position detector comprises:

a lifted position detector that detects the lifted position of the gripper body; and a lowered position detector that detects the lowered position of the gripper body.

* * * * *